United States Patent
Yamamoto

(10) Patent No.: US 6,880,422 B2
(45) Date of Patent: Apr. 19, 2005

(54) SHIFT ACTUATOR FOR A TRANSMISSION

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/606,953

(22) Filed: Jun. 27, 2003

(65) Prior Publication Data

US 2003/0230158 A1 Dec. 18, 2003

Related U.S. Application Data

(62) Division of application No. 10/051,079, filed on Jan. 22, 2002, now abandoned.

(30) Foreign Application Priority Data

| Jan. 22, 2001 | (JP) | ................................ 2001-13161 |
| Feb. 16, 2001 | (JP) | ................................ 2001-40070 |
| Feb. 16, 2001 | (JP) | ................................ 2001-40592 |

(51) Int. Cl.⁷ ........................ B60K 17/04; B60K 17/12
(52) U.S. Cl. ................. 74/473.12; 74/473.25; 74/471 XY
(58) Field of Search .................. 74/471 XY, 473.1, 74/473.12, 473.21, 473.25

(56) References Cited

U.S. PATENT DOCUMENTS

| 3,795,153 | A | | 3/1974 | Seilly |
| RE32,783 | E | * | 11/1988 | Clark ........................ 335/261 |
| 4,860,792 | A | * | 8/1989 | Ichihashi et al. ...... 137/596.17 |
| 5,172,603 | A | * | 12/1992 | MacInnis ...................... 74/335 |
| 5,241,292 | A | * | 8/1993 | Bjorknas et al. ............ 335/256 |
| 5,333,686 | A | | 8/1994 | Vaughan et al. |
| 5,346,175 | A | | 9/1994 | Hunnicutt |
| 5,507,197 | A | | 4/1996 | Devaud et al. |
| 5,836,207 | A | | 11/1998 | Spooner et al. |
| 5,856,771 | A | * | 1/1999 | Nippert ...................... 335/262 |
| 6,070,485 | A | | 6/2000 | Funk, Sr. et al. |
| 6,076,430 | A | | 6/2000 | Huber et al. |
| 6,151,975 | A | | 11/2000 | Kirkpatrick et al. |
| 6,446,522 | B1 | | 9/2002 | Warren et al. |
| 2002/0000323 | A1 | | 1/2002 | McDonald |
| 2002/0096009 | A1 | * | 7/2002 | Yamamoto et al. ...... 74/473.12 |
| 2002/0189388 | A1 | * | 12/2002 | Suzuki .................... 74/473.12 |

FOREIGN PATENT DOCUMENTS

| DE | 33 668 | | 6/1962 |
| DE | 19842532 | * | 9/1999 |
| DE | 198 42 532 A 1 | | 9/1999 |
| JP | 58191354 | | 11/1983 |
| WO | WO 99/18373 | | 4/1999 |

* cited by examiner

Primary Examiner—Robert A. Siconolfi
Assistant Examiner—Devon Kramer
(74) Attorney, Agent, or Firm—James N. Dresser, Esq.

(57) ABSTRACT

A shift actuator for a transmission, which actuates, in a direction of shift, a shift lever for operating a synchronizing device of the transmission, the shift actuator comprising a first electromagnetic solenoid and a second electromagnetic solenoid for actuating an operation member coupled to the shift lever in the directions opposite to each other. Each of the first electromagnetic solenoid and the second electromagnetic solenoid comprises a casing, a fixed iron core disposed in the casing, a moving iron core arranged to be allowed to approach, and separate away from, the fixed iron core, an operation rod mounted on the moving iron core to engage with the operation member, and an electromagnetic coil arranged between the casing and the fixed iron core as well as the moving iron core.

3 Claims, 22 Drawing Sheets

Fig. 15
(a)
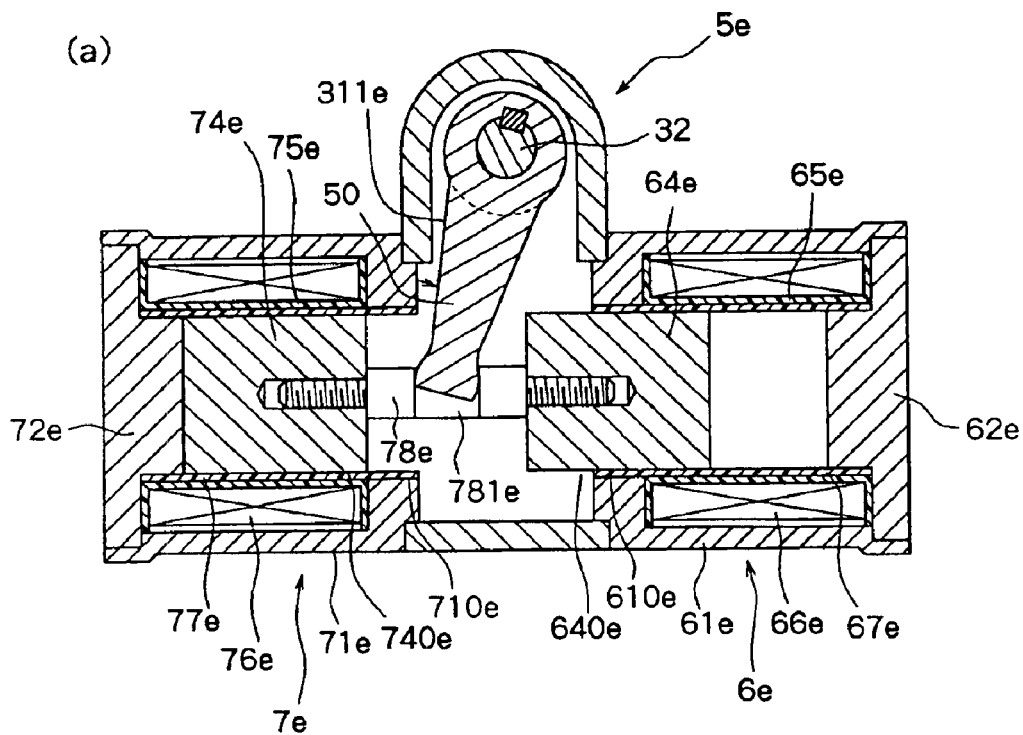
(b)
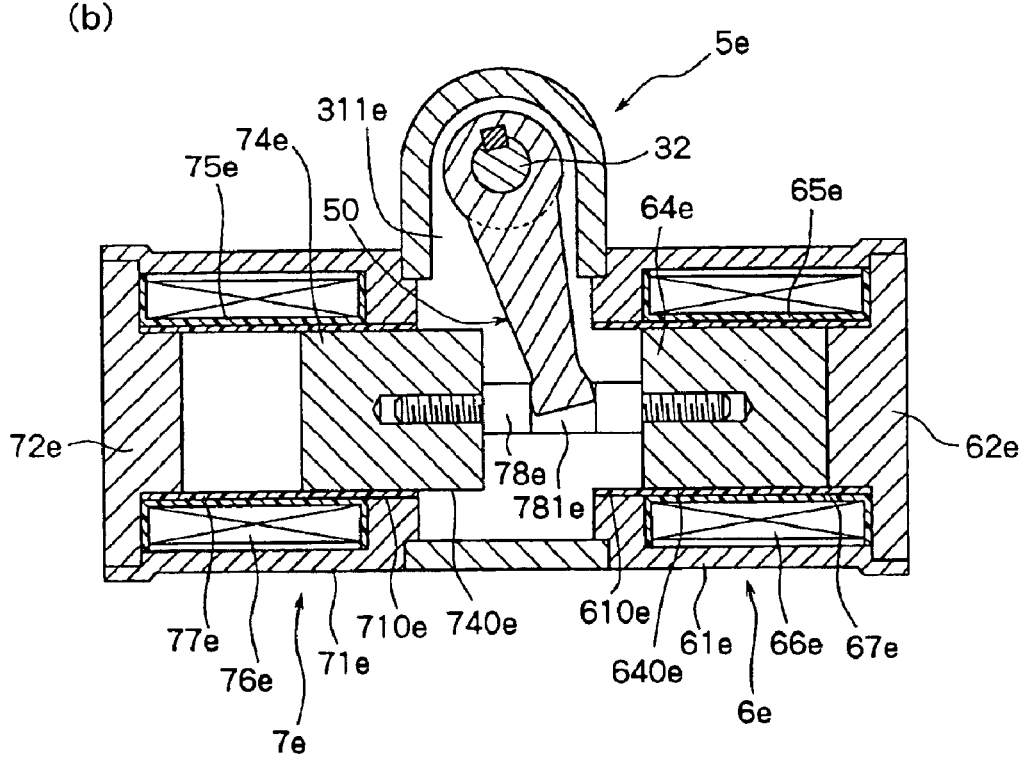

Fig. 19
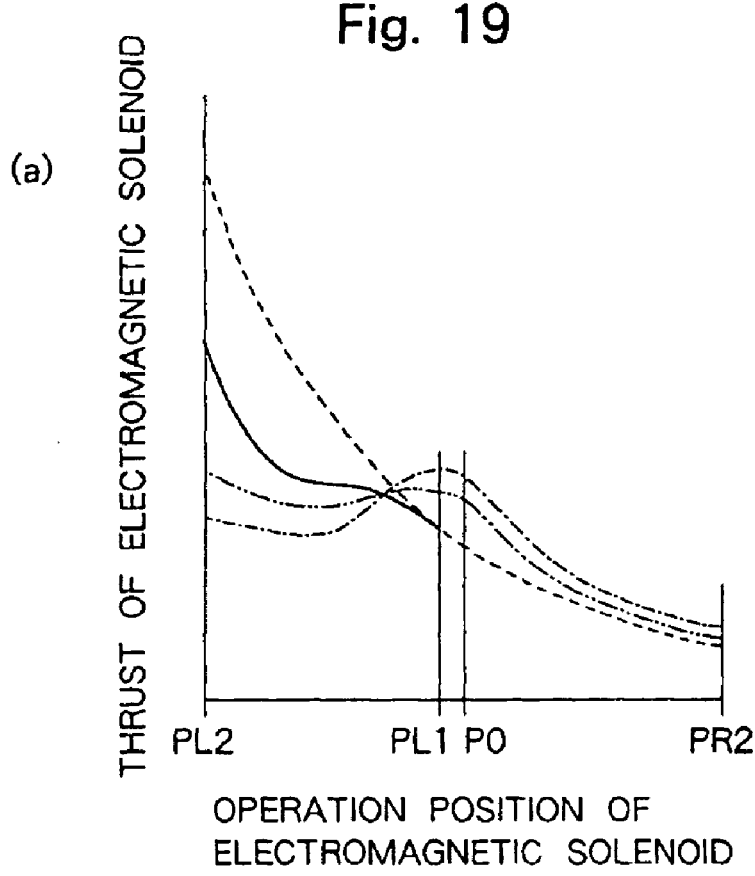
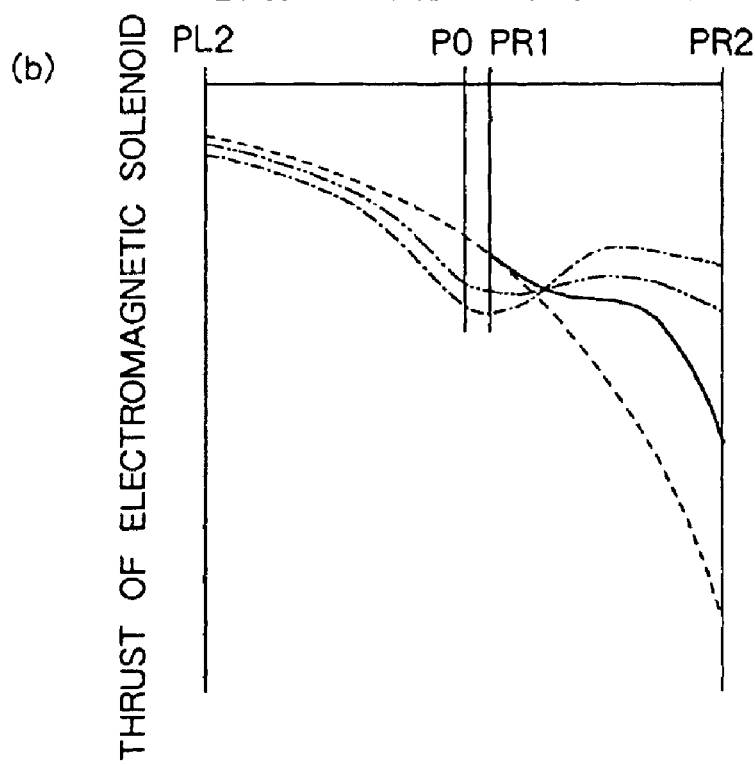

Fig. 21
(a) 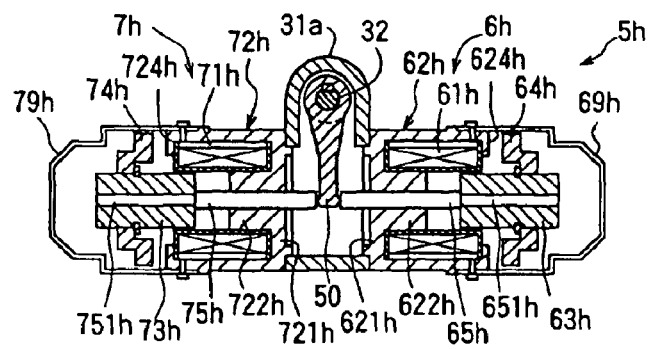
(b) 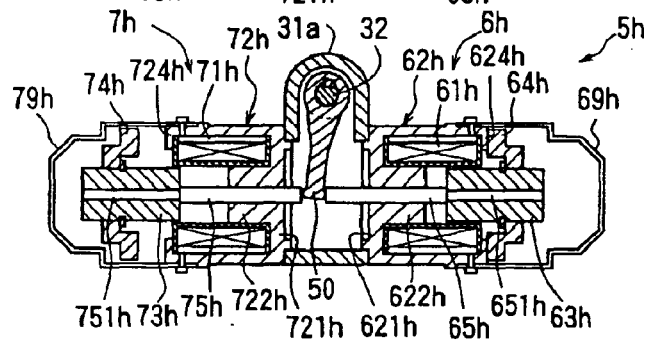
(c) 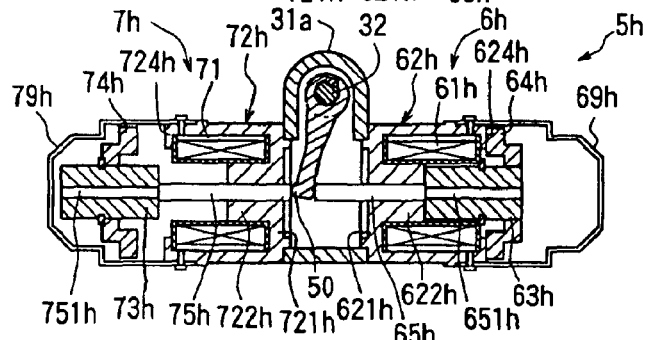
(d) 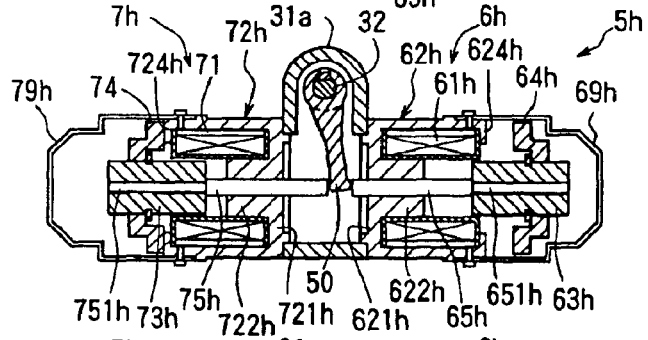
(e) 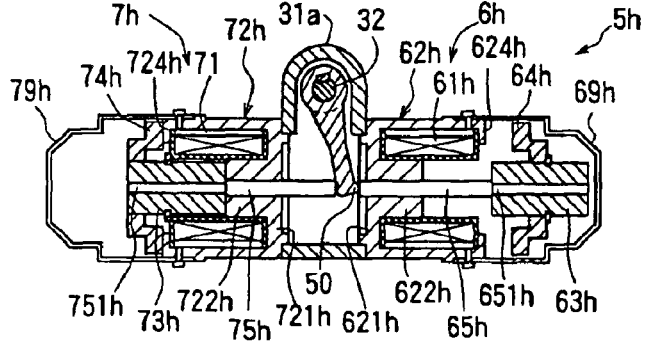

Fig. 22
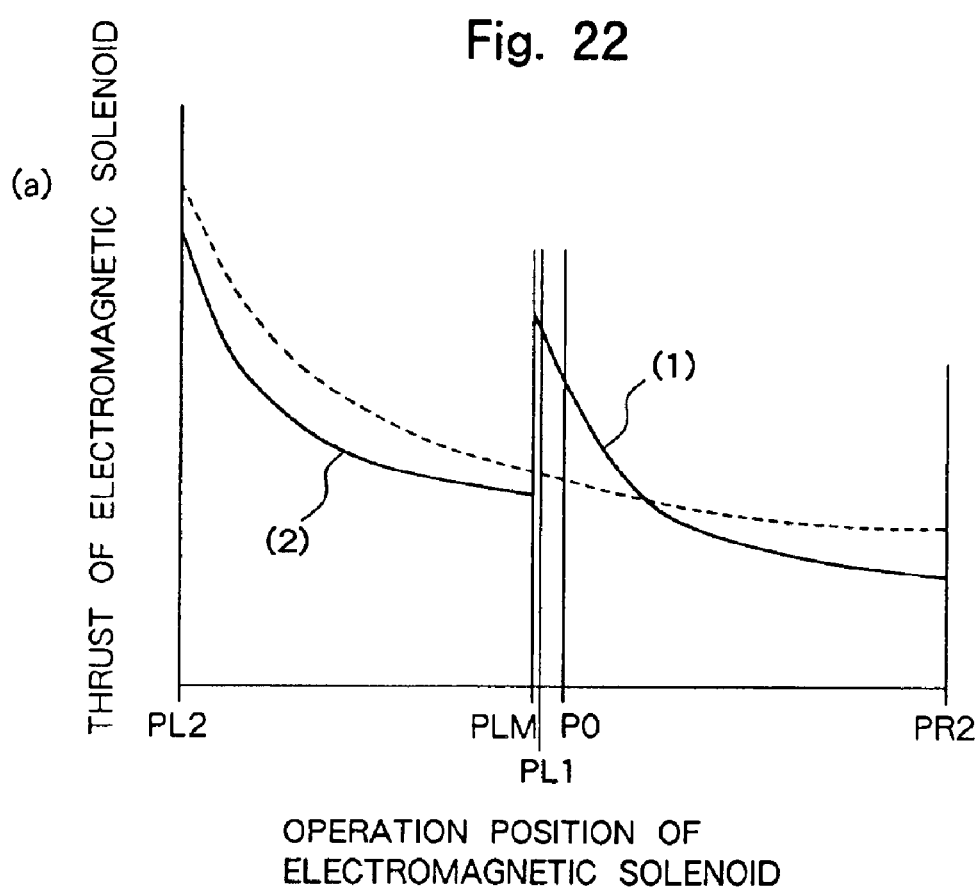
(a)
OPERATION POSITION OF ELECTROMAGNETIC SOLENOID
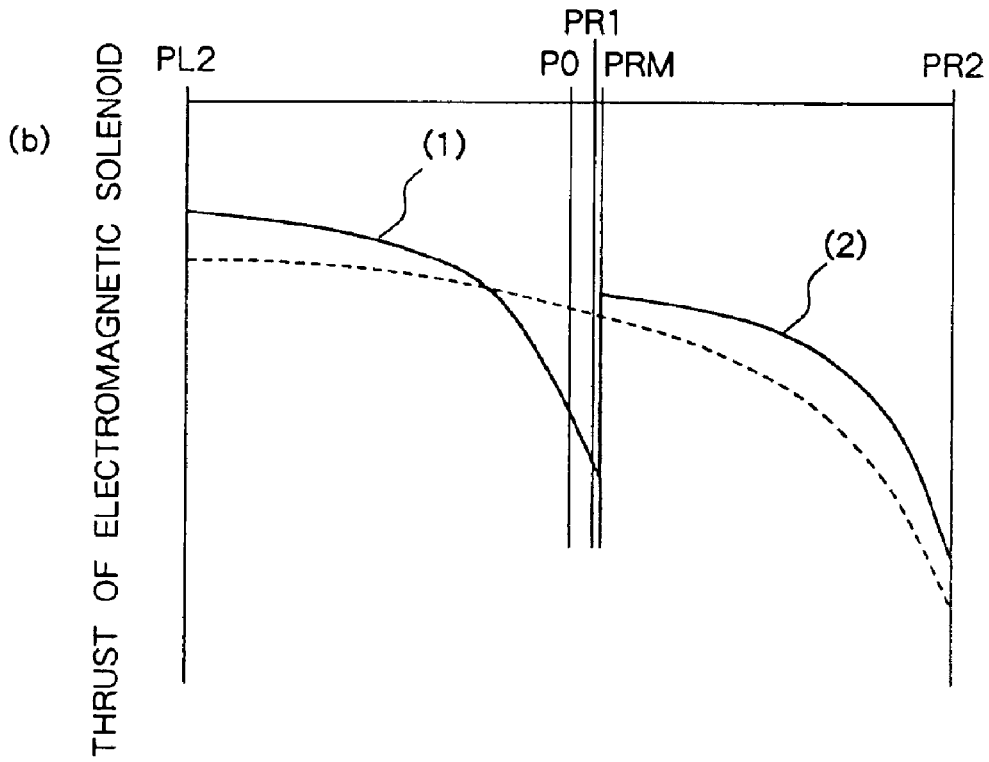
(b)

SHIFT ACTUATOR FOR A TRANSMISSION

CROSS REFERENCE TO RELATED APPLICATIONS

This application is a divisional application of U.S. patent application Ser. No. 10/051,079, filed Jan. 22, 2002 now abandoned.

FIELD OF THE INVENTION

The present invention relates to a shift actuator for a transmission, which actuates, in a direction of shift, a shift lever for operating a synchronizing device of the transmission mounted on a vehicle.

DESCRIPTION OF THE RELATED ART

As the shift actuator for a transmission, which actuates, in a direction of shift, a shift lever for operating a synchronizing device of the transmission, there has been generally used a fluid pressure cylinder which utilizes the fluid pressure such as air pressure or hydraulic pressure as a source of actuation. The shift actuator using the fluid pressure cylinders requires a piping for connecting the source of fluid pressure to the actuators, an electromagnetic change-over valve for changing over the flow passage of the operation fluid, and space for the arrangement thereof, resulting in an increase in the weight of the device as a whole.

In recent years, there has been proposed an actuator constituted by an electric motor as a shift actuator for a transmission mounted on a vehicle which is provided with neither a source of the compressed air nor a source of the hydraulic pressure. The shift actuator constituted by the electric motor needs neither the piping for connection to the source of fluid pressure nor the electromagnetic change-over valve, unlike the actuators that use fluid pressure cylinders, and can, hence, be constituted in a compact size as a whole and in a reduced weight.

The actuator using an electric motor needs a speed reduction mechanism for obtaining a predetermined actuating force. As the speed reduction mechanism, there have been proposed the one using a ball-screw mechanism and the one using a gear mechanism. However, the actuators using the ball-screw mechanism and gear mechanism are not necessarily satisfactory in regard to the durability of the ball-screw mechanism and the gear mechanism, in regard to the durability and the operation speed of the electric motor.

SUMMARY OF THE INVENTION

It is an object of the present invention to provide a shift actuator for a transmission, which features excellent durability and a high operation speed.

In order to achieve the above-mentioned object according to the present invention, there is provided a shift actuator for a transmission, which actuates, in a direction of shift, a shift lever for operating a synchronizing device of the transmission, the shift actuator comprising:

a first electromagnetic solenoid and a second electromagnetic solenoid for actuating an operation member coupled to the shift lever in the directions opposite to each other;

each of the first electromagnetic solenoid and the second electromagnetic solenoid comprising a casing, a fixed iron core disposed in the casing, a moving iron core arranged to be allowed to approach, and separate away from, the fixed iron core, an operation rod mounted on the moving iron core to engage with the operation member, and an electromagnetic coil arranged between the casing and the fixed iron core as well as the moving iron core.

It is desired that a stepped protuberance is formed on either one of the opposing surfaces of the fixed iron core and of the moving iron core, a stepped recess is formed in the other surface to correspond to the stepped protuberance, and a position at which an edge of the protuberance and an edge of the recess become closest to each other is so constituted as to correspond to the synchronizing position of the synchronizing device.

According to the present invention, further, there is provided a shift actuator for a transmission, which actuates, in a direction of shift, a shift lever for operating a synchronizing device of the transmission, the shift actuator comprising:

a first electromagnetic solenoid and a second electromagnetic solenoid for actuating an operation member coupled to the shift lever in the directions opposite to each other;

each of the first electromagnetic solenoid and the second electromagnetic solenoid comprising an electromagnetic coil, a fixed iron core disposed in the electromagnetic coil, a moving iron core arranged to be allowed to approach, and separate away from, the fixed iron core, a fixed yoke having an inner peripheral surface opposing an outer peripheral surface of the moving iron core, and an operation rod mounted on the moving iron core to engage with the operation member; and the opposing areas of the moving iron core and the fixed yoke being so constituted as to decrease, at a position where the fixed iron core ceases to attract the moving iron core.

It is desired that a stepped protuberance is formed on either one of the opposing surfaces of the fixed iron core and of the moving iron core, a stepped recess is formed in the other surface to correspond to the stepped protuberance, and a position at which an edge of the protuberance and an edge of the recess become closest to each other is so constituted as to correspond to the synchronizing position of the synchronizing device.

According to the present invention, there is further provided a shift actuator for a transmission, comprising a first electromagnetic solenoid and a second electromagnetic solenoid for actuating, in the directions opposite to each other, an operation member coupled to the shift lever to operate a synchronizing device of the transmission;

each of the first electromagnetic solenoid and the second electromagnetic solenoid including an electromagnetic coil, a fixed iron core excited by the electromagnetic coil, a first moving iron core arranged to be capable of being contacted with, and separate away from, the fixed iron core, a second moving iron core fitted to an outer peripheral surface of the first moving iron core so as to slide there along, and an operation rod mounted on the first moving iron core to engage with the operation member; the fixed iron core having a first attraction portion for attracting the first moving iron core and a second attraction portion for attracting the second moving iron core, and the first moving iron core being provided with a limiting means for limiting the second moving iron core from moving toward the side of the fixed iron core; and the second moving iron core and the first moving iron core moving together, by the action of the limiting means, until the second moving iron core comes in contact with the second attraction portion, then, the first moving iron core alone moving toward the first attraction portion after the second moving iron core has come in contact with the second attraction portion, and a position at which the second moving iron core comes in contact with the second attraction portion being so set as to correspond to a position just after a synchronizing position of the synchronizing device.

BRIEF DESCRIPTION OF THE DRAWINGS

FIG. 15 is a view illustrating the operation states of the shift actuator according to the sixth embodiment shown in FIG. 14;

FIG. 19 is a diagram illustrating a relationship between the operation positions and the thrust of the shift actuator;

FIG. 21 is a view illustrating the operation states of the shift actuator according to the ninth embodiment shown in FIG. 21; and FIG. 22 is a diagram illustrating a relationship between the operation positions and the thrust of the shift actuator.

DETAILED DESCRIPTION OF THE PREFERRED EMBODIMENTS

Preferred embodiments of the shift actuator for a transmission constituted according to the present invention will now be described in further detail with reference to the accompanying drawings.

Figure 1:
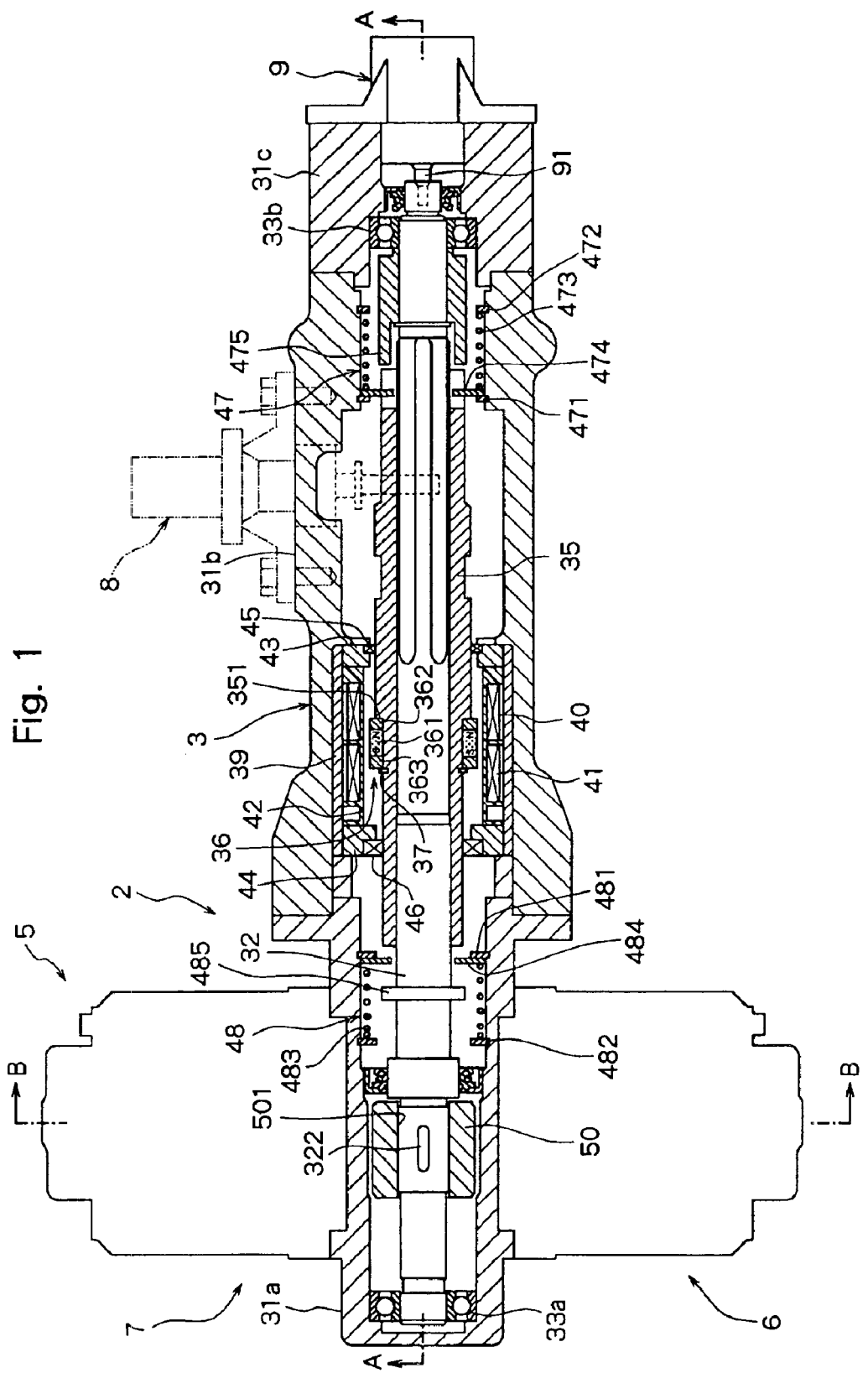
FIG. 1 is a sectional view illustrating a gear change device provided with a shift actuator constituted according to a first embodiment of the present invention.
Figure 2:
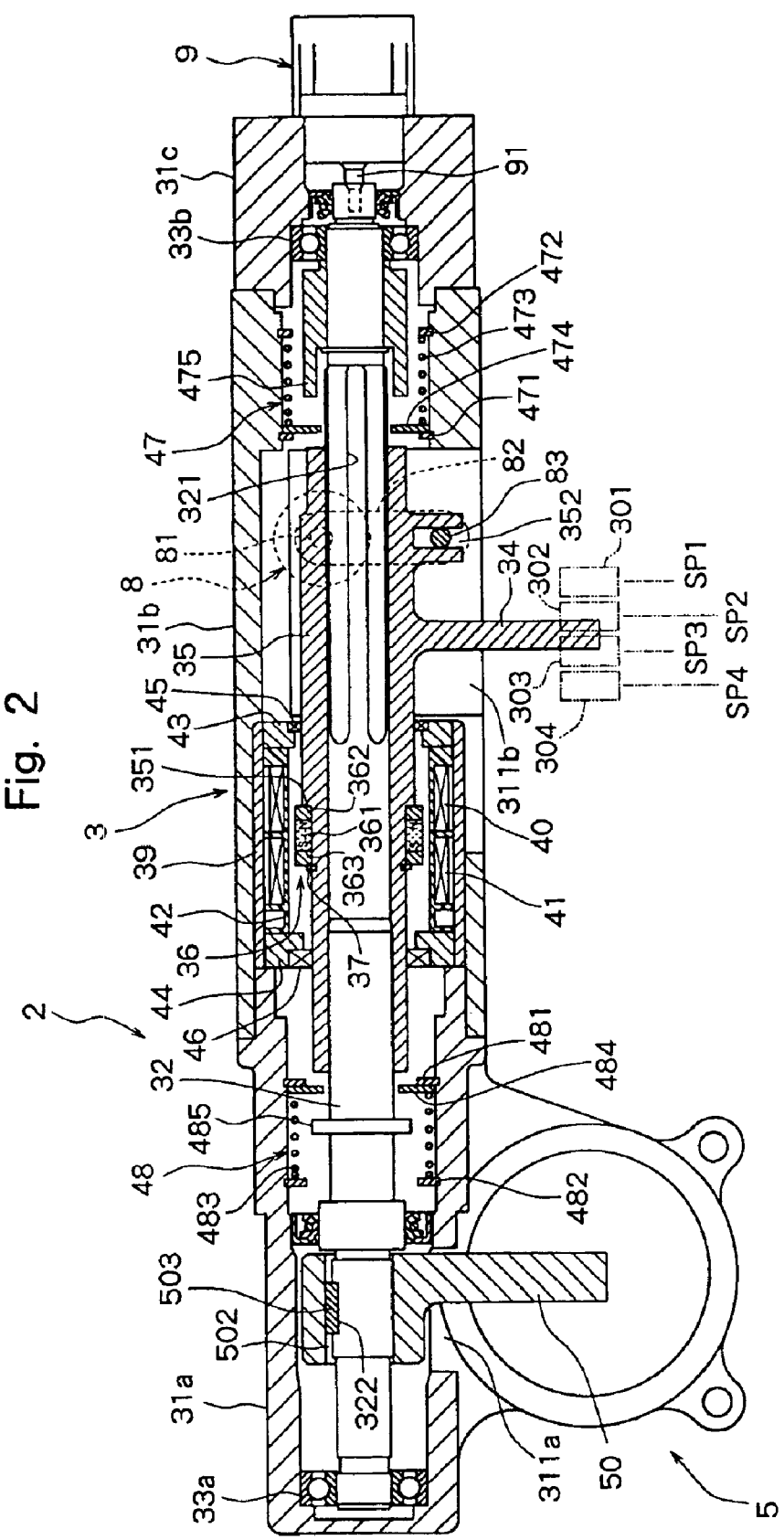
FIG. 2 is a sectional view along the line A—A in FIG. 1.

FIG. 1 is a sectional view illustrating a gear change device provided with a shift actuator constituted according to a first embodiment of the present invention, and FIG. 2 is a sectional view along the line A—A in FIG. 1.

A gear change device 2 according to the illustrated embodiment is constituted by a select actuator 3 and a shift actuator 5. The select actuator 3 has three cylindrical casings 31a, 31b and 31c. A control shaft 32 is disposed in the three casings 31a, 31b and 31c, and both ends of the control shaft 32 are rotatably supported by the casings 31a and 31c on both sides via bearings 33a and 33b. A spline 321 is formed in an intermediate portion of the control shaft 32. A cylindrical shift sleeve 35 constituted integratedly with a shift lever 34 is spline-fitted to the spline 321 so as to slide in the axial direction. The shift lever 34 and the shift sleeve 35 are made of a nonmagnetic material such as a stainless steel, and the shift lever 34 is disposed being inserted in an opening 311b formed in a lower portion of the central casing 31b. An end of the shift lever 34 is so constituted as to suitably engage with shift blocks 301, 302, 303 and 304 which are disposed at a first select position SP1, at a second select position SP2, at a third select position SP3 and at a fourth select position SP4 and are constituting a shift mechanism for a transmission that is not shown.

A magnetic moving means 36 is disposed on the outer peripheral surface of the shift sleeve 35. The magnetic moving means 36 is constituted by an annular permanent magnet 361 that is mounted on the outer peripheral surface of the shift sleeve 35 and has magnetic poles in both end surfaces in the axial direction and by a pair of moving yokes 362 and 363 disposed on the outer sides of the permanent magnet 361 in the axial direction thereof. The permanent magnet 361 in the illustrated embodiment is magnetized into an N-pole in the right end surface in FIGS. 1 and 2, and is magnetized into an S-pole in the left end surface in FIGS. 1 and 2. The above pair of moving yokes 362 and 363 is made of a magnetic material in an annular shape. The thus constituted magnetic moving means 36 is positioned at its right end (in FIGS. 1 and 2) of the one moving yoke 362 (right side in FIGS. 1 and 2) by a step 351 formed in the shift sleeve 35, and is positioned at its left end (in FIGS. 1 and 2) of the other moving yoke 363 (left side in FIGS. 1 and 2) by a snap ring 37 fitted to the shift sleeve 35, so that the motion in the axial direction thereof is limited. A fixed yoke 39 is disposed on the outer peripheral side of the magnetic moving means 36 to surround the magnetic moving means 36. The fixed yoke 39 is made of a magnetic material in a cylindrical shape and is mounted on the inner peripheral surface of the central casing 31b. A pair of coils 40 and 41 is arranged on the inside of the fixed yoke 39. The pair of coils 40 and 41 is wound on a bobbin 42 that is made of a nonmagnetic material such as a synthetic resin and is mounted on the inner peripheral surface of the fixed yoke 39. The pair of coils 40 and 41 is connected to a power source circuit that is not shown. The length of the coil 40 in the axial direction nearly corresponds to a length of selection from the first select position SP1 up to the fourth select position SP4. End walls 43 and 44 are mounted on both sides of the fixed yoke 39. On the inner periphery of the end walls 43 and 44 are mounted sealing members 45 and 46 that come in contact with the outer peripheral surface of the shift sleeve 35.

The select actuator 3 is constituted as described above, and works based on a principle of a linear motor that is constituted by the magnetic moving means 36 disposed on the shift sleeve 35 that serves as the shift lever support member, by the fixed yoke 39 and by the pair of coils 40 and 41. The operation will now be described with reference to FIG. 3.

In the select actuator 3 according to the first embodiment, there is established a magnetic circuit 368 passing through the N-pole of permanent magnet 361, one moving yoke 362, one coil 40, fixed yoke 39, the other coil 41, the other moving yoke 363 and S-pole of permanent magnet 361, as shown in FIGS. 3(a) and 3(b). In this state, when electric currents are supplied to the pair of coils 40 and 41 in directions opposite to each other as shown in FIG. 3(a), a thrust toward the right is produced by the permanent magnet 361, i.e., by the shift sleeve 35, as indicated by an arrow in FIG. 3(a) in accordance with the Fleming's left-hand rule. As shown in FIG. 3(b), on the other hand, when the electric currents are supplied to the pair of coils 40 and 41 in the directions just opposite to the directions of FIG. 3a, a thrust toward the left is produced by the permanent magnet 361, i.e., by the shift sleeve 35, as indicated by an arrow in FIG. 3(b) in accordance with the Fleming's left-hand rule. The magnitude of thrust produced by the permanent magnet 361, i.e., produced by the shift sleeve 35, is determined by the amount of electric power supplied to the pair of coils 40 and 41.

The actuator 3 in the illustrated embodiment has a first select position-limiting means 47 and a second select position-limiting means 48 for limiting the position of the shift lever 34 to the first select position SP1, second select position SP2, third select position SP3 or fourth select position SP4 in cooperation with the magnitude of thrust acting on the magnetic moving means 36, i.e., acting on the shift sleeve 35. The first select position-limiting means 47 comprises snap rings 471 and 472 fitted to right end portions (in FIGS. 1 and 2) of the central casing 31b at a predetermined interval, a compression coil spring 473 disposed between the snap rings 471 and 472, a moving ring 474 disposed between the compression coil spring 473 and one snap ring 471, and a stopper 475 for limiting the motion of the moving ring 474 by coming in contact therewith when the moving ring 474 is moved toward the right in FIGS. 1 and 2 by a predetermined amount.

When in a state as shown in FIGS. 1 and 2, a current is supplied to the pair of coils 40 and 41 at a voltage of, for example, 2.4 V as shown in FIG. 3(a), the thus constituted first select position-limiting means 47 so works that the magnetic moving means 36 moves, i.e., the shift sleeve 35 moves, toward the right in FIGS. 1 and 2, and the right end of the shift sleeve 35 in FIGS. 1 and 2 comes in contact with the moving ring 474 to be limited for its position. In this state, the resilient force of the coil spring 473 has been set so as to be larger than the thrust that acts on the permanent magnet 361, i.e., that acts on the shift sleeve 35. Therefore, the shift sleeve 35 in contact with the moving ring 474 is brought into a halt at a position where the moving ring 474 is in contact with the one snap ring 471. In this case, the shift lever 34 constituted integratedly with the shift sleeve 35 is brought to the second select position SP2. Next, when the current is supplied to the pair of coils 40 and 41 at a voltage of, for example, 4.8 V as shown in FIG. 3(a), the thrust acting on the magnetic moving means 36, i.e., acting on the shift sleeve 35, has been set so as to become larger than the resilient force of the coil spring 473. Accordingly, the shift sleeve 35 that has come in contact with the moving ring 474, then, moves toward the right in FIGS. 1 and 2 against the resilient force of the coil spring 473, and the moving ring 474 is brought into a halt at a position where the moving ring 474 comes in contact with the stopper 475. At this moment, the shift lever 34 constituted integratedly with the shift sleeve 35 is brought to the first select position SP1.

Next, the second select position-limiting means 48 will be described.

The second select position-limiting means 48 comprises snap rings 481 and 482 fitted to left end portions (in FIGS. 1 and 2) of the central casing 31b at a predetermined interval, a coil spring 483 disposed between the snap rings 481 and 482, a moving ring 484 disposed between the coil spring 483 and one snap ring 481, and a stopper 485 for limiting the motion of the moving ring 484 by coming in contact therewith when the moving ring 484 is moved toward the left in FIGS. 1 and 2 by a predetermined amount.

When in a state as shown in FIGS. 1 and 2, a current is supplied to the pair of coils 40 and 41 at a voltage of, for example, 2.4 V as shown in FIG. 3(b), the thus constituted second select position-limiting means 48 so works that the permanent magnet 361 moves, i.e., the shift sleeve 35 moves, toward the left in FIGS. 1 and 2, and the left end of the shift sleeve 35 comes in contact with the moving ring 484 in FIGS. 1 and 2 to be limited for its position. In this state, the resilient force of the coil spring 483 has been set so as to be larger than the thrust that acts on the permanent magnet 361, i.e., that acts on the shift sleeve 35. Therefore, the shift sleeve 35 in contact with the moving ring 484 is brought into a halt at a position where the moving ring 484 is in contact with the one snap ring 481. In this case, the shift lever 34 constituted integratedly with the shift sleeve 35 is brought to the third select position SP3. Next, when the current is supplied to the pair of coils 40 and 41 at a voltage of, for example, 4.8 V as shown in FIG. 3b, the thrust acting on the permanent magnet 361, i.e., acting on the shift sleeve 35, has been set so as to become larger than the resilient force of the coil spring 483. Accordingly, the shift sleeve 35 that has come in contact with the moving ring 484, then, moves toward the left in FIGS. 1 and 2 against the resilient force of the coil spring 483, and the moving ring 484 is brought into a halt at a position where the moving ring 484 comes in contact with the stopper 485. At this moment, the shift lever 34 constituted integratedly with the shift sleeve 35 is brought to the fourth select position SP4.

As described above, according to the illustrated embodiment provided with the first select position-limiting means 47 and with the second select position-limiting means 48, the shift lever 34 can be brought to a predetermined select position by controlling the amount of electric power supplied to the pair of coils 40 and 41 without executing the position control operation.

The gear change device according to the illustrated embodiment has a select position sensor 8 for detecting the position of the shift sleeve 35 constituted integratedly with the shift lever 34, i.e., for detecting the position thereof in the direction of selection. The select position sensor 8 comprises a potentiometer, and a rotary shaft 81 thereof is attached to an end of a lever 82. An engaging pin 83 attached to the other end of the lever 82 is brought into engagement with an engaging groove 352 formed in the shift sleeve 35. Therefore, as the shift sleeve 35 moves toward the right and left in FIG. 2, the lever 82 swings on the rotary shaft 81 as a center, and the rotary shaft 81 rotates to detect the operation position of the shift sleeve 35, i.e., to detect the position thereof in the direction of selection. In response to a signal from the select position sensor 8, the shift lever 34 is brought to a desired select position by controlling the voltage and the direction of current supplied to the coils 40 and 41 of the select actuator 3 by using a control means which is not shown.

Further, the gear change device 2 of the illustrated embodiment has a shift stroke position sensor 9 for detecting the rotational position, i.e., for detecting the shift stroke position of the control shaft 32 mounting the shift sleeve 35 constituted integratedly with the shift lever 34. The shift stoke position sensor 9 comprises a potentiometer with its rotary shaft 91 being linked to the control shaft 32. When the control shaft 32 rotates, therefore, the rotary shaft 91 rotates to detect the rotational position, i.e., to detect the shift stroke position, of the control shaft 32.

Next, the shift actuator constituted according to the first embodiment of the present invention will be described with reference chiefly to FIG. 4.

Figure 4:
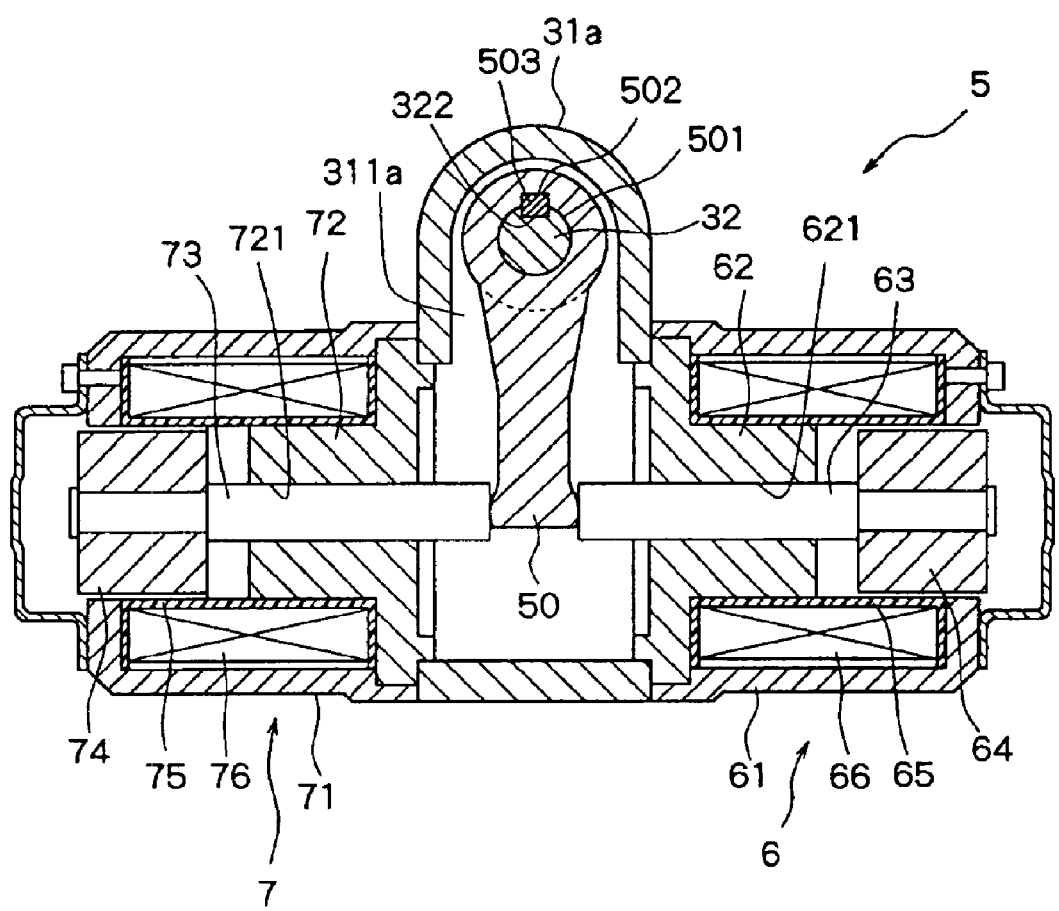
FIG. 4 is a sectional view along the line B—B in FIG. 1.

The shift actuator 5 according to the first embodiment shown in FIG. 4 has a first electromagnetic solenoid 6 and a second electromagnetic solenoid 7 for actuating, in the directions opposite to each other, an operation lever 50 mounted on the control shaft 32 disposed in the casings 31a, 31b, 31c of the select actuator 3. The operation lever 50 has a hole 501 formed in its base portion to be fitted to the control shaft 32. By fitting a key 503 to a key groove 502 formed in the inner peripheral surface of the hole 501 and to a key groove 322 formed in the outer peripheral surface of the control shaft 32, the operation lever 50 turns integratedly with the control shaft 32. The operation lever 50 works as an operation member which is coupled to the shift lever 34 via the control shaft 32 and the shift sleeve 35, and is disposed being inserted in an opening 311a formed in the lower portion of the casing 31a which is on the left side in FIGS. 1 and 2.

Next, the first electromagnetic solenoid 6 will be described.

The first electromagnetic solenoid 6 comprises a casing 61, a fixed iron core 62 that is made of a magnetic material and is disposed in the casing 61, an operation rod 63 that is made of a nonmagnetic material such as a stainless steel and is disposed being inserted in a through hole 621 formed in the central portion of the fixed iron core 62, a moving iron core 64 that is made of a magnetic material and is mounted on the operation rod 63 to be allowed to approach, and separate away from, the fixed iron core 62, and an electromagnetic coil 66 that is wound on a bobbin 65 made of a nonmagnetic material such as synthetic resin and is disposed between the casing 61 and the moving iron core 64 as well as the fixed iron core 62. The thus constituted first electromagnetic solenoid 6 so works that the moving iron core 64 is attracted by the fixed iron core 62 when an electric current is supplied to the electromagnetic coil 66. As a result, the operation rod 63 mounting the moving iron core 64 moves toward the left in FIG. 4 and its end acts on the operation lever 50 to turn it clockwise on the control shaft 32 as a center. Then, the shift lever 34 constituted integratedly with the shift sleeve 35 mounted on the control shaft 32 undergoes a shifting operation in one direction.

Next, the second electromagnetic solenoid 7 will be described.

The second electromagnetic solenoid 7 is disposed opposite the first electromagnetic solenoid 6. Like the first electromagnetic solenoid 6, the second electromagnetic solenoid 7, too, comprises a casing 71, a fixed iron core 72 that is made of a magnetic material and is disposed in the casing 71, an operation rod 73 that is made of a nonmagnetic material such as a stainless steel and is disposed being inserted in a through hole 721 formed in the central portion of the fixed iron core 72, a moving iron core 74 that is made of a magnetic material and is mounted on the operation rod 73 to be allowed to approach, and separate away from, the fixed iron core 72, and an electromagnetic coil 76 that is wound on a bobbin 75 made of a nonmagnetic material such as synthetic resin and is disposed between the casing 71 and the moving iron core 74 as well as the fixed iron core 72. The thus constituted second electromagnetic solenoid 7 so works that the moving iron core 74 is attracted by the fixed iron core 72 when an electric current is supplied to the electromagnetic coil 76. As a result, the operation rod 73 mounting the moving iron core 74 moves toward the right in FIG. 4 and its end acts on the operation lever 50 to turn it counterclockwise on the control shaft 32 as a center. Then, the shift lever 34 constituted integratedly with the shift sleeve 35 mounted on the control shaft 32 undergoes a shifting operation in the other direction.

As described above, the shift actuator 5 according to the first embodiment has the first electromagnetic solenoid and the second electromagnetic solenoid for actuating the operation lever 50 (operation member) coupled to the shift lever 34 in the directions opposite to each other. Therefore, the shift actuator features improved durability since it has no rotary mechanism and features a compact constitution and an increased operation speed since it needs no speed reduction mechanism constituted by a ball-screw mechanism or a gear mechanism that is employed by the actuator that uses an electric motor.

Figure 5:
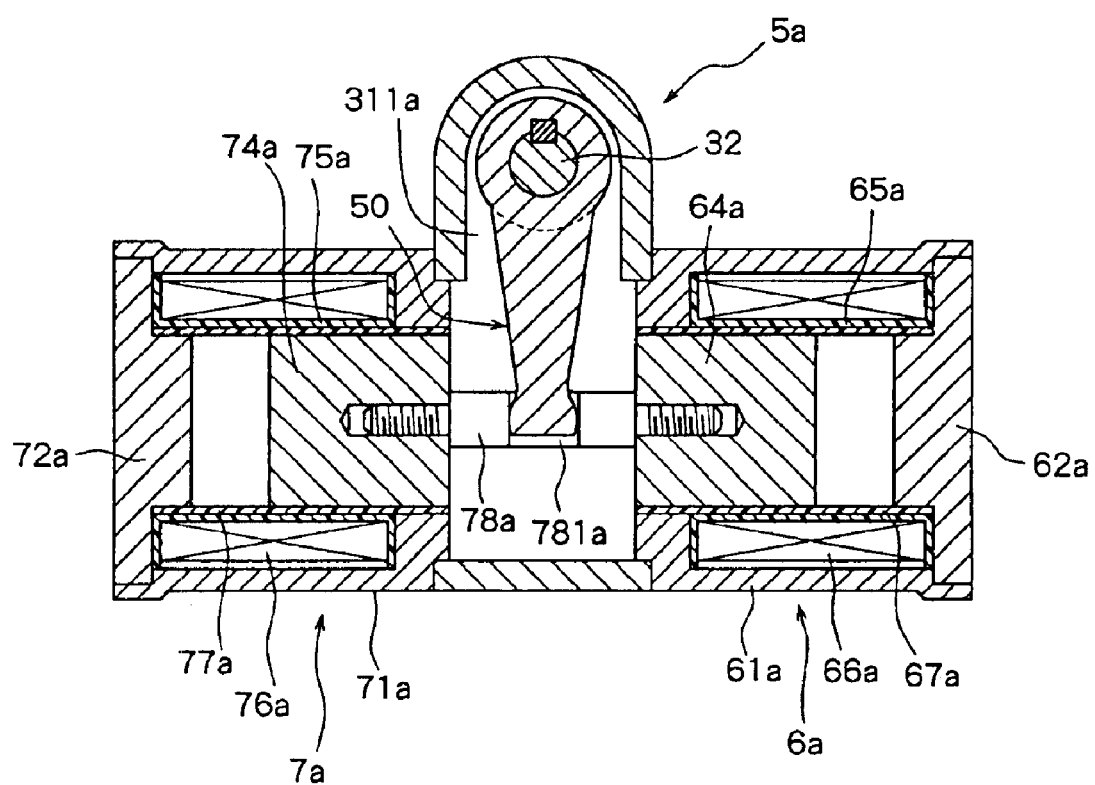
FIG. 5 is a sectional view illustrating the shift actuator constituted according to a second embodiment of the present invention.

Next, the shift actuator constituted according to a second embodiment of the present invention will be described with reference to FIG. 5. In the shift actuator 5a according to the second embodiment shown in FIG. 5, the members same as those of the first embodiment shown in FIG. 4 are denoted by the same reference numerals and their description is not repeated.

The shift actuator 5 of the first embodiment shown in FIG. 4 is of the pushing type. The shift actuator 5a of the second embodiment shown in FIG. 5, however, is of the pulling type. That is, the shift actuator 5a according to the second embodiment has a first electromagnetic solenoid 6a and a second electromagnetic solenoid 7a for actuating, in the directions opposite to each other, the operation lever 50 mounted on the control shaft 32. The first electromagnetic solenoid 6a comprises a casing 61a, a fixed iron core 62a that is made of a magnetic material and is disposed in the casing 61a, a moving iron core 64a made of a magnetic material and is disposed to be allowed to approach, and separate away from, the fixed iron core 62a, an electromagnetic coil 66a that is wound on a bobbin 65a made of a nonmagnetic material such as synthetic resin and is disposed between the casing 61a and the moving iron core 64a as well as the fixed iron core 62a, and a cylindrical slide guide 67a that is made of a suitable synthetic resin and is disposed on the inside of the bobbin 65a to guide the motion of the moving iron core 64a.

The second electromagnetic solenoid 7a is disposed opposite the first electromagnetic solenoid 6a. Like the first electromagnetic solenoid 6a, the second electromagnetic solenoid 7a, too, comprises a casing 71a, a fixed iron core 72a that is made of a magnetic material and is disposed in the casing 71a, a moving iron core 74a that is made of a magnetic material and is disposed to be allowed to approach, and separate away from, the fixed iron core 72a, an electromagnetic coil 76a that is wound on a bobbin 75a made of a nonmagnetic material such as synthetic resin and is disposed between the casing 71a and the moving iron core 74a as well as the fixed iron core 72a, and a cylindrical slide guide 77a that is made of a suitable synthetic resin and is disposed on the inside of the bobbin 75a to guide the motion of the moving iron core 74a. In the shift actuator 5a of the second embodiment, the moving iron core 64a of the first electromagnetic solenoid 6a and the moving iron core 74a of the second electromagnetic solenoid 7a are coupled together by an operation rod 78a. A groove is formed in the central portion of the operation rod 78a, and an end of the operation lever 50 comes into engagement with the groove 781a.

The shift actuator 5a according to the second embodiment is constituted as described above. The operation will now be described below.

When an electric current is supplied to the electromagnetic coil 76a of the second electromagnetic solenoid 7a, the moving iron core 74a is attracted by the fixed iron core 72a. As a result, the operation rod 78a coupled to the moving iron core 74a moves toward the left in FIG. 5, causing the control shaft 32 to turn clockwise via the operation lever 50 of which the end is fitted to the groove 781a formed in the central portion of the operation rod 78a. Therefore, the shift lever 34 constituted integratedly with the shift sleeve 35 mounted on the control shaft 32, is shifted in one direction. Further, when the electric current is supplied to the electromagnetic coil 66a of the first electromagnetic solenoid 6a, the moving iron core 64a is attracted by the fixed iron core 62a. As a result, the operation rod 78a coupled to the moving iron core 64a moves toward the right in FIG. 5, causing the control shaft 32 to turn counter clock wise via the operation lever 50 of which the end is fitted to the groove 781a formed in the central portion of the operation rod 78a. Therefore, the shift lever 34 constituted integratedly with the shift sleeve 35 mounted on the control shaft 32, is shifted in the other direction.

Figure 3:
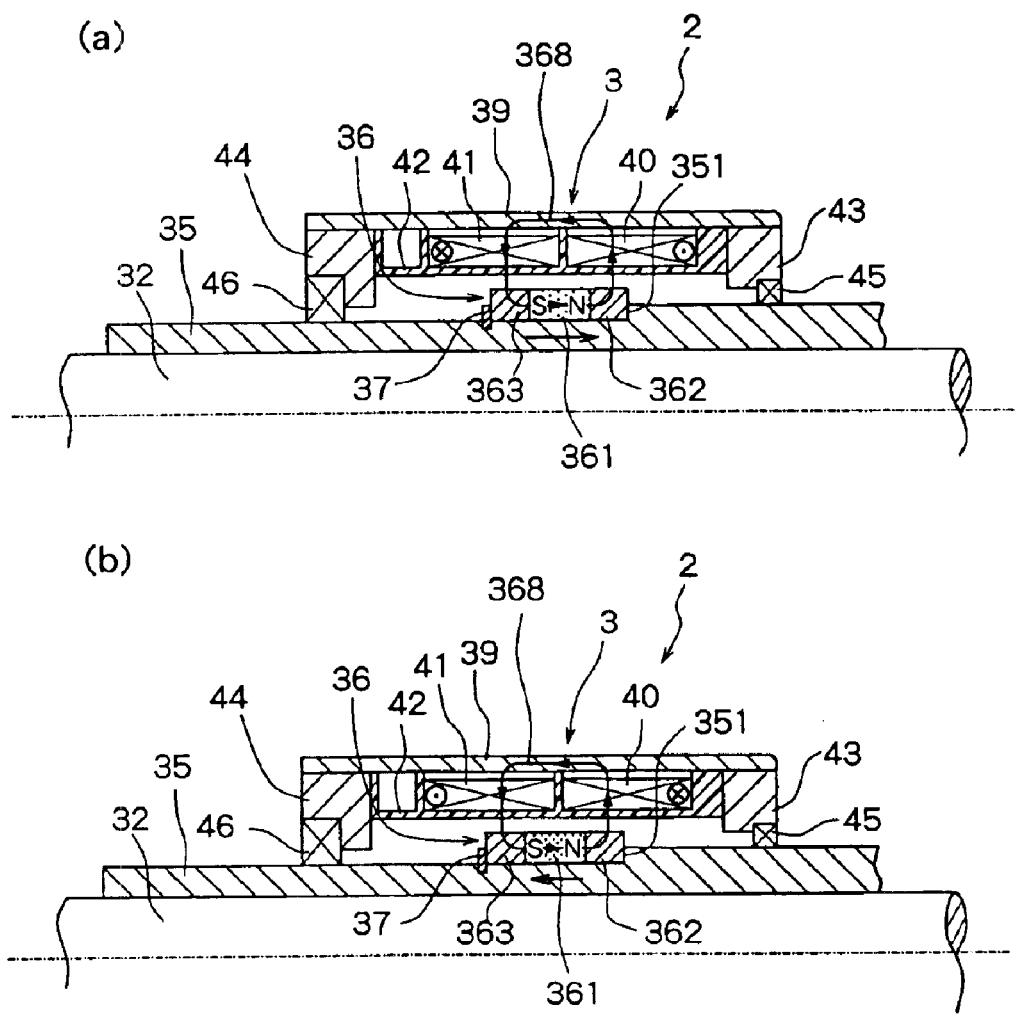
FIG. 3 is a view illustrating the operation of a select actuator that constitutes the gear change device shown in FIG. 1.

Next, the shift actuator constituted according to a third embodiment of the present invention will be described with reference to FIG. 6. In the shift actuator 5b according to the third embodiment shown in FIG. 6, the members same as those of the first embodiment shown in FIG. 3 are denoted by the same reference numerals and their description is not repeated.

Figure 6:
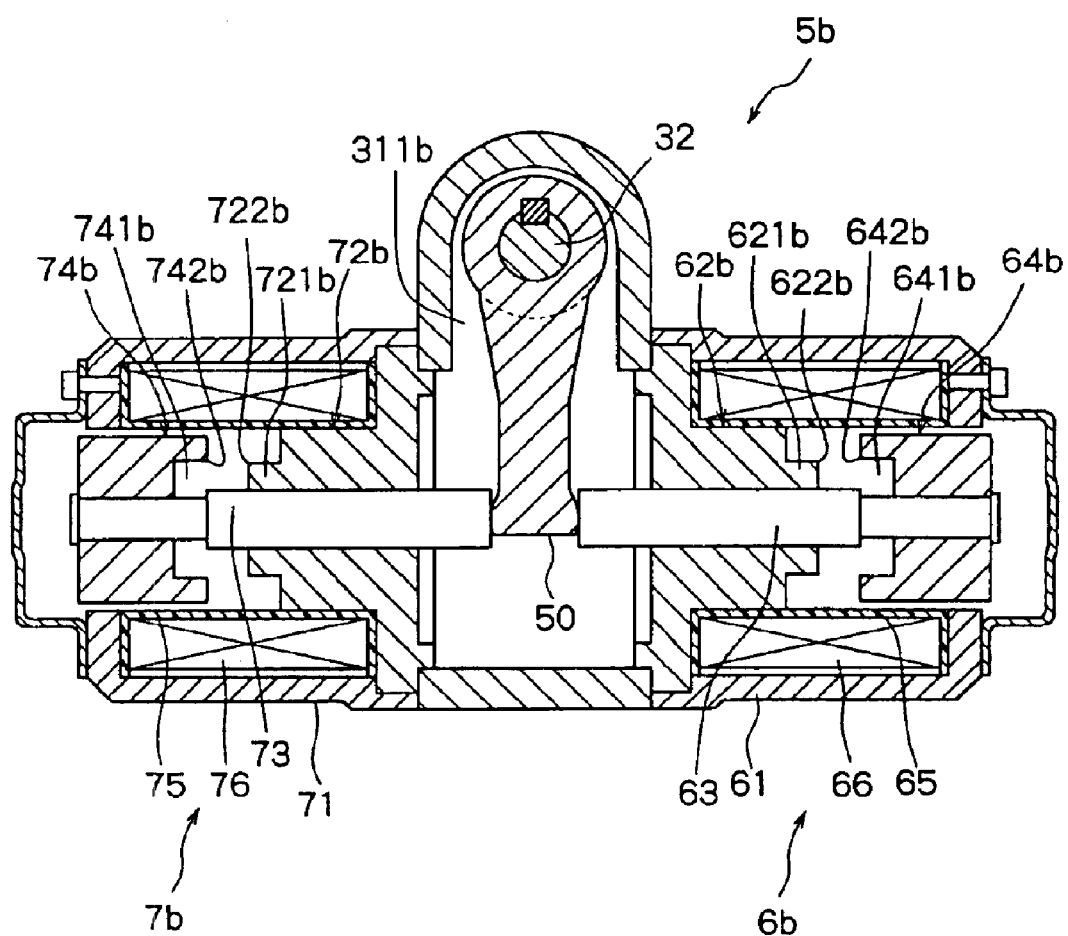
FIG. 6 is a sectional view illustrating the shift actuator constituted according to a third embodiment of the present invention.

The shift actuator 5b, too, of the third embodiment shown in FIG. 6 has, like that of the first embodiment, a first electromagnetic solenoid 6b and a second electromagnetic solenoid 7b for actuating the operation lever 50 mounted on the control shaft 32 that is disposed in the casings 31a, 31b and 31c of the select actuator 3. The first electromagnetic solenoid 6b and the second electromagnetic solenoid 7b of the third embodiment are different from the first electromagnetic solenoid 6 and the second electromagnetic solenoid 7 of the first embodiment in regard to the shapes of the opposing end surfaces of the fixed iron cores and of the moving iron cores. That is, the first electromagnetic solenoid 6b and the second electromagnetic solenoid 7b of the third embodiment have a feature in that stepped protuberances 621b and 721b are respectively formed at the centers of the end surfaces of the fixed cores 62b and 72b opposed to the moving iron cores 64b and 74b, and that stepped recesses 641b and 741b are respectively formed in the centers of the end surfaces of the moving iron cores 64b and 74b opposed to the fixed iron cores 62b and 72b, the recesses 641b and 741b being corresponded to the protuberances 621b and 721b. The positions where the edges 622b, 722b of the protuberances 621b, 721b of the fixed iron cores 62b, 72b become closest to edges 642b and 742b of the recesses 641b, 741b of the moving iron cores 64b, 74b are so constituted as to correspond to the synchronizing positions of the synchronizing device as will be described later. The embodiment shown in FIG. 6 has dealt with a case where the stepped protuberances 621b and 721b are formed on the fixed iron cores 62b and 72b, and the stepped recesses 641b and 741b are formed in the moving iron cores 64b and 74b. It is, however, also allowable to form the stepped protuberances on the moving iron cores 64b and 74b, and to form the stepped recesses in the fixed iron cores 62b and 72b.

The shift actuator 5b according to the third embodiment is constituted as described above. Described below with reference to FIGS. 7, 8 and 10 are a relationship between the operation positions of the first electromagnetic solenoid 6b and of the second electromagnetic solenoid 7b and the corresponding shift stroke positions of the synchronizing device with which the transmission (not shown) is furnished, as well as the thrusts at the operation positions of the first electromagnetic solenoid 6b and of the second electromagnetic solenoid 7b.

Figure 7:
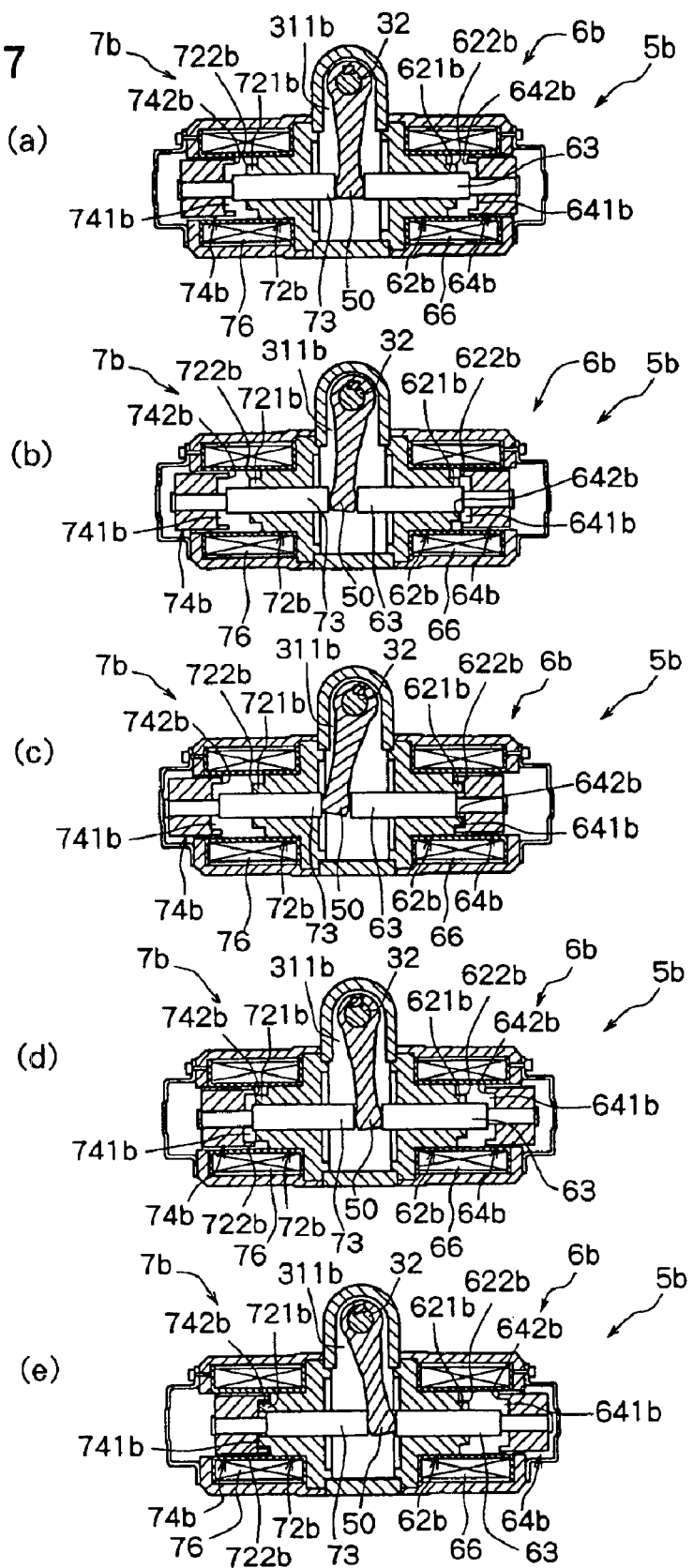
FIG. 7 is a view illustrating the shift stroke positions of a synchronizing device corresponding to the operation states of the shift actuator according to the third embodiment shown in FIG. 6.

FIG. 7 illustrates the operation states of the first electromagnetic solenoid 6b and of the second electromagnetic solenoid 7b. In FIG. 7, FIG. 7(a) illustrates a state where the synchronizing device is brought to a neutral position, FIG. 7(b) illustrates a state where the synchronizing device is brought to a synchronizing position by the first electromagnetic solenoid 6b, FIG. 7(c) illustrates a state where the synchronizing device is brought to a gear-engaging position by the first electromagnetic solenoid 6b, FIG. 7(d) illustrates a state where the synchronizing device is brought to a synchronizing position by the second electromagnetic solenoid 7b, and FIG. 7(e) illustrates a state where the synchronizing device is brought to a gear-engaging position by the second electromagnetic solenoid 7b.

Figure 8:
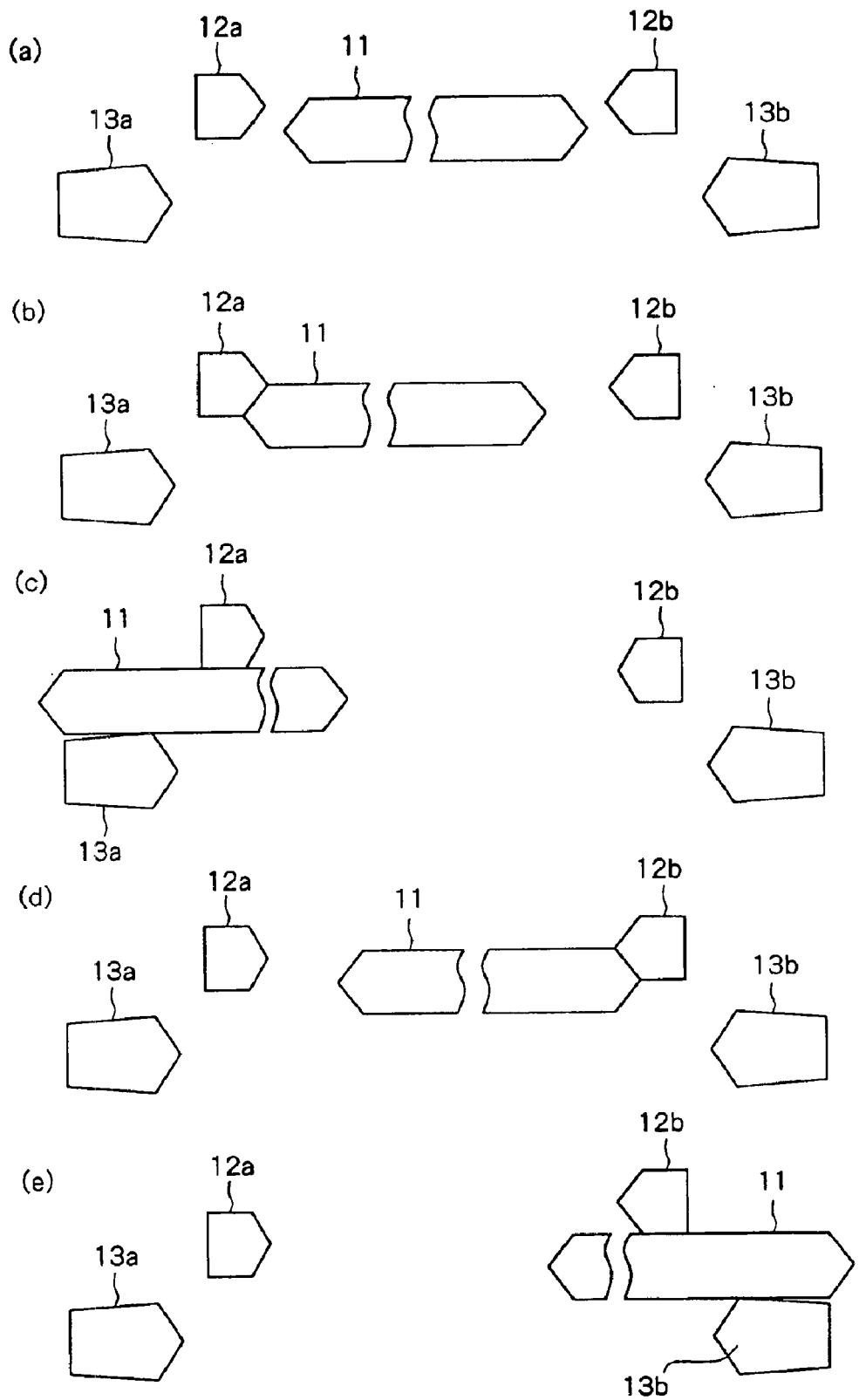
FIG. 8 is a view illustrating the shift stroke positions of a synchronizing device corresponding to the operation states of the shift actuator according to the third embodiment shown in FIG. 6.

FIG. 8 illustrates a relationship among the spline 11 of the clutch sleeve, teeth 12a, 12b of the synchronizer rings, and dog teeth 13a, 13b. In FIG. 8, FIG. 8(a) illustrates a neutral state, FIG. 8(b) illustrates a synchronized state of when the first electromagnetic solenoid 6b is operated, FIG. 8(c) illustrates a gear-engaged state of when the first electromagnetic solenoid 6b is operated, FIG. 8(d) illustrates a synchronized state of when the second electromagnetic solenoid 7b is operated, and FIG. 8(e) illustrates a gear-engaged state of when the second electromagnetic solenoid 7b is operated.

Figure 10:
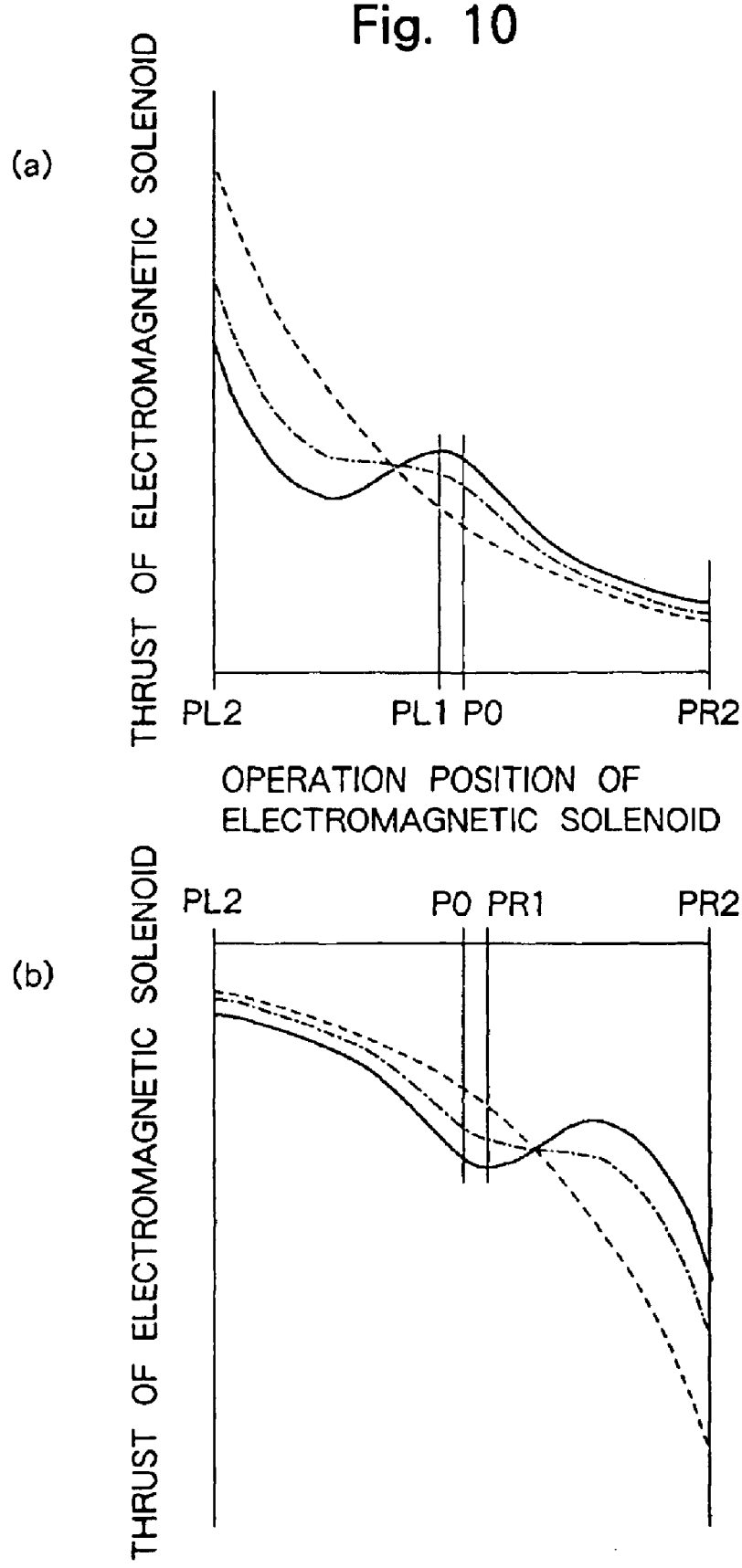
FIG. 10 is a diagram illustrating a relationship between the operation positions and the thrust of the shift actuator.

FIG. 10 is a diagram illustrating a relationship between the thrusts and the operation positions of operation rods 63 and 73 of the first electromagnetic solenoid 6b and of the second electromagnetic solenoid 7b. In FIGS. 10(a) and 10(b), the operation position P0 of the electromagnetic solenoid shows a state where the first electromagnetic solenoid 6b and the second electromagnetic solenoid 7b are in the neutral state shown in FIG. 7(a), PR2 shows a state where the first electromagnetic solenoid 6b and the second electromagnetic solenoid 7b are at the gear-engaging position shown in FIG. 7(e), and PL2 shows a state where the first electromagnetic solenoid 6b and the second electromagnetic solenoid 7b are at the gear-engaging position shown in FIG. 7(c). FIG. 10(a) is a graph illustrating the thrust at each of the operation positions of when the first electromagnetic solenoid 6b is energized to be operated from a state where the first electromagnetic solenoid 6b and the second electromagnetic solenoid 7b are in the gear-engaged state PR2 shown in FIG. 7(e) up to the gear-engaging position PL2 shown in FIG. 7(c). FIG. 10(b) is a graph illustrating the thrust at each of the operation positions of when the second electromagnetic solenoid 7b is energized to be operated from a state where the first electromagnetic solenoid 6b and the second electromagnetic solenoid 7b are in the gear-engaged state PL2 shown in FIG. 7(c) up to the gear-engaging position PR2 shown in FIG. 7(e).

First, described below with reference to FIG. 10(a) is the thrust at each of the operation positions (graph indicated by a solid line) of when the first electromagnetic solenoid 6b is energized to be operated from a state where the first electromagnetic solenoid 6b and the second electromagnetic solenoid 7b are in the gear-engaged state PR2 shown in FIG. 7(e) up to the gear-engaging position PL2 shown in FIG. 7(c). When an electric current is supplied to the electromagnetic coil 66 of the first electromagnetic solenoid 6b in the gear-engaged state shown in FIG. 7(e) (i.e., gear-engaged state shown in FIG. 8(e) in the case of the synchronizing device), the moving iron core 64b is attracted by the fixed iron core 62b to produce a thrust on the operation rod 63. At the gear-engaging position PR2 (stroke start position), however, the thrust is small since the gap is large between the moving iron core 64b and the fixed iron core 62b. The thrust increases as the moving iron core 64b moves toward the fixed iron core 62b. As the neutral position represented by P0 in FIG. 10(a) is passed, i.e., as the neutral state shown in FIG. 7(a) is passed (as the neutral state shown in FIG. 8(a) is passed in the case of the synchronizing device), the edge 642b of the recess 641b of the moving iron core 64b approaches the edge 622b of the protuberance 621b of the fixed iron core 62b. At the synchronizing position represented by PL1 in FIG. 10(a), i.e., in the synchronized state shown in FIG. 7(b) (in the synchronized state shown in FIG. 8(b) in the case of the synchronizing device), the two edges most approach each other. In the synchronized state shown in FIG. 7(b), the thrust increases since the magnetic flux density increases at the two edges. When the synchronized position represented by PL1 in FIG. 10(a) is passed, there is established a state where the recess 621b of the moving iron core 64b fits to the protuberance 641b of the fixed iron core 62b. Therefore, the thrust decreases since the magnetic flux acts in the radial direction at the fitting portion. As the moving iron core 64b further approaches the fixed iron core 62b, the thrust sharply increases and arrives at the gear-engaging position (end of stroke) represented by PL2 in FIG. 10(a), i.e., arrives at the gear-engaged state shown in FIG. 7(c) (gear-engaged state shown in FIG. 8(c) in the case of the synchronizing device).

Next, described below with reference to FIG. 10(b) is the thrust at each of the operation positions (graph indicated by a solid line) of when the second electromagnetic solenoid 7b is energized to be operated from a state where the first electromagnetic solenoid 6b and the second electromagnetic solenoid 7b are in the gear-engaged state PL2 shown in FIG. 7(c) up to the gear-engaging position PR2 shown in FIG. 7(e). When an electric current is supplied to the electromagnetic coil 76 of the second electromagnetic solenoid 7b in the gear-engaged state shown in FIG. 7(c) (i.e., gear-engaged state shown in FIG. 8(c) in the case of the synchronizing device), the moving iron core 74b is attracted by the fixed iron core 72b to produce a thrust on the operation rod 73. At the gear-engaging position PL2 (stroke start position), however, the thrust is small since the gap is large between the moving iron core 74b and the fixed iron core 72b. The thrust increases as the moving iron core 74b moves toward the fixed iron core 72b. As the neutral position represented by P0 in FIG. 10(b) is passed, i.e., as the neutral state shown in FIG. 7(a) is passed (as the neutral state shown in FIG. 8(a) is passed in the case of the synchronizing device), the edge 742b of the recess 741b of the moving iron core 74b approaches the edge 722b of the protuberance 721b of the fixed iron core 72b. At the synchronizing position represented by PR1 in FIG. 10(b), i.e., in the synchronized state shown in FIG. 7(d) (in the synchronized state shown in FIG. 8(d) in the case of the synchronizing device), the two edges most approach each other. In the synchronized state shown in FIG. 7(d), the thrust increases since the magnetic flux density increases at the two edges. When the synchronized position represented by PR1 in FIG. 10(b) is passed, there is established a state where the recess 721b of the moving iron core 74b fits to the protuberance 741b of the fixed iron core 72b. Therefore, the thrust decreases since the magnetic flux acts in the radial direction at the fitting portion. As the moving iron core 74b further approaches the fixed iron core 72b, the thrust sharply increases and arrives at the gear-engaging position (end of stroke) represented by PR2 in FIG. 10(b), i.e., arrives at the gear-engaged state shown in FIG. 7(e) (gear-engaged state shown in FIG. 8(e) in the case of the synchronizing device).

As described above, the shift actuator 5b comprising the first electromagnetic solenoid 6b and the second electromagnetic solenoid 7b according to the third embodiment has such characteristics that the thrust once swells at the synchronizing positions (PL1, PR1) of the synchronizing device. Namely, a predetermined thrust is obtained at the synchronizing position where the operation force is required, making it possible to use the electromagnetic solenoids of a small size. In FIGS. 10(a) and 10(b), broken lines show thrust characteristics of when the shift actuator 5 in the above-mentioned first embodiment has a size same as that of the shift actuator 5b in the above-mentioned third embodiment, from which it is learned that the thrust is small at the synchronizing positions (PL1, PR1) when compared to the thrust characteristics of the shift actuator 5b of the third embodiment indicated by the solid lines. In order for the shift actuator 5 of the first embodiment to produce the thrust at the synchronizing positions (PL1, PR1) comparable to that of the shift actuator 5b of the third embodiment, the shift actuator 5 of the first embodiment must use the electromagnetic solenoids of a large size. The shift actuator 5b of the third embodiment, on the other hand, can employ the electromagnetic solenoids of a small size. Further, the shift actuator 5b according to the third embodiment produces, at the end of the stroke, a thrust which is smaller than that of the shift actuator 5 of the first embodiment and hence, produces a decreased impact at the end of the stroke. The third embodiment shown in FIG. 6 has dealt with the case where the invention was applied to the push-type actuator corresponding to that of the first embodiment. However, the same action and effect are also obtained even by applying the present invention to the pull-type actuator of the second embodiment.

Figure 9:
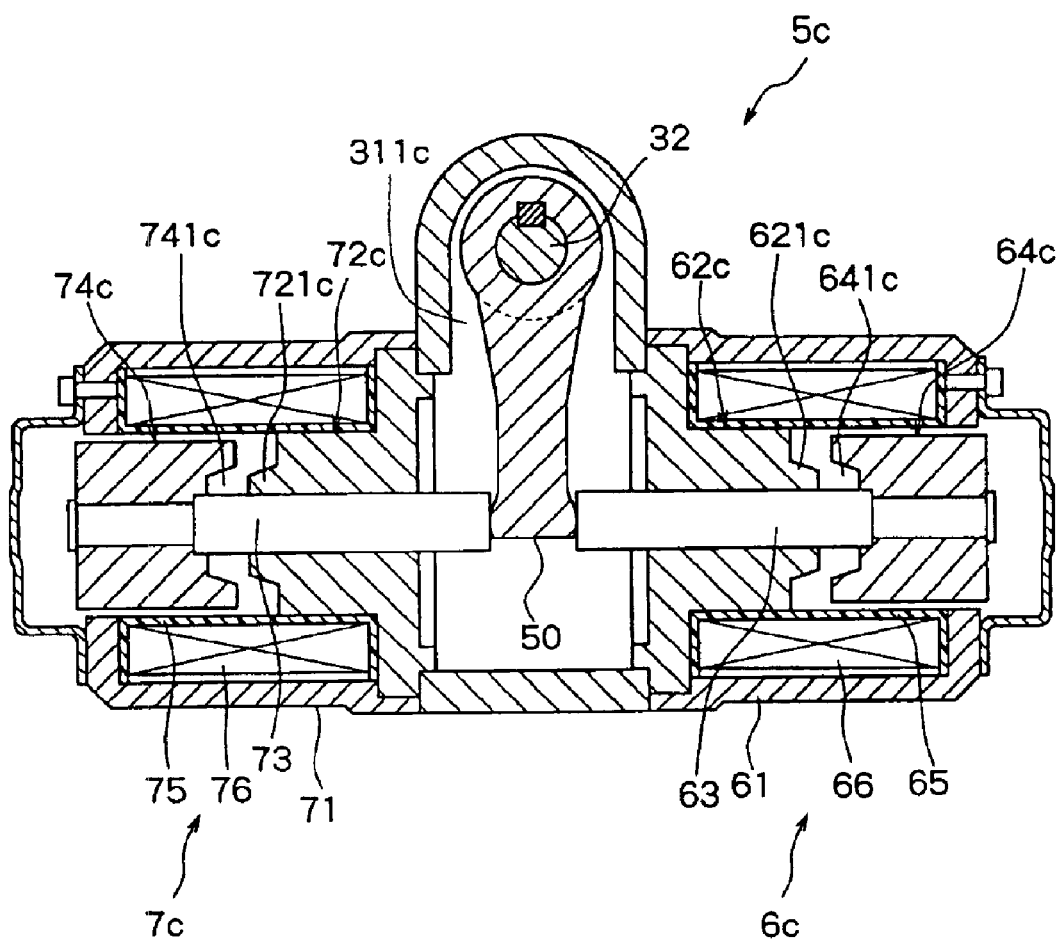
FIG. 9 is a sectional view illustrating the shift actuator constituted according to a fourth embodiment of the present invention.

Next, a fourth embodiment of the shift actuator constituted according to the present invention will be described with reference to FIG. 9. In the shift actuator 5c of the fourth embodiment shown in FIG. 9, the same members as those of the third embodiment shown in FIG. 6 are denoted by the same reference numerals but are not described again in detail.

According to the shift actuator 5c of the fourth embodiment, the stepped protuberances 621c, 721c formed at the centers on the end surfaces of the fixed iron cores 62c, 72c constituting the first electromagnetic solenoid 6c and the second electromagnetic solenoid 7c as well as the stepped recesses 641c, 741c corresponding to the protuberances 621c, 721c formed at the centers on the end surfaces of the fixed iron cores 62c, 72c, have shapes different from the shapes of the stepped protuberances 621b, 721b of the actuator 5b and of the stepped recesses 641b, 741b of the third embodiment shown in FIG. 6. That is, the outer peripheral surfaces of the protuberances 621b, 721b and the inner peripheral surfaces of the recesses 641b, 741b, have the same diameters over the full length in the third embodiment. In the shift actuator 5c according to the fourth embodiment shown in FIG. 9, on the other hand, the outer peripheral surfaces of the protuberances 621c, 721c and the inner peripheral surfaces of the recesses 641c, 741c are tapered. The thus constituted shift actuator 5c exhibits intermediate thrust characteristics as indicated by dot-and-dash chain lines in FIGS. 10(a) and 10(b) lying between the thrust characteristics of the shift actuator 5b of the third embodiment indicated by the solid lines and the thrust characteristics of the actuator 5 of the first embodiment indicated by the broke lines. The thrust characteristics approach those indicated by the solid lines when the outer peripheral surfaces of the protuberances 621c, 721c and the outer peripheral surfaces of the recesses 641c, 741c have a small tapered angle, and approach those indicated by the broken lines when the outer peripheral surfaces of the protuberances 621c, 721c and the outer peripheral surfaces of the recesses 641c, 741c have a large tapered angle.

Figure 11:
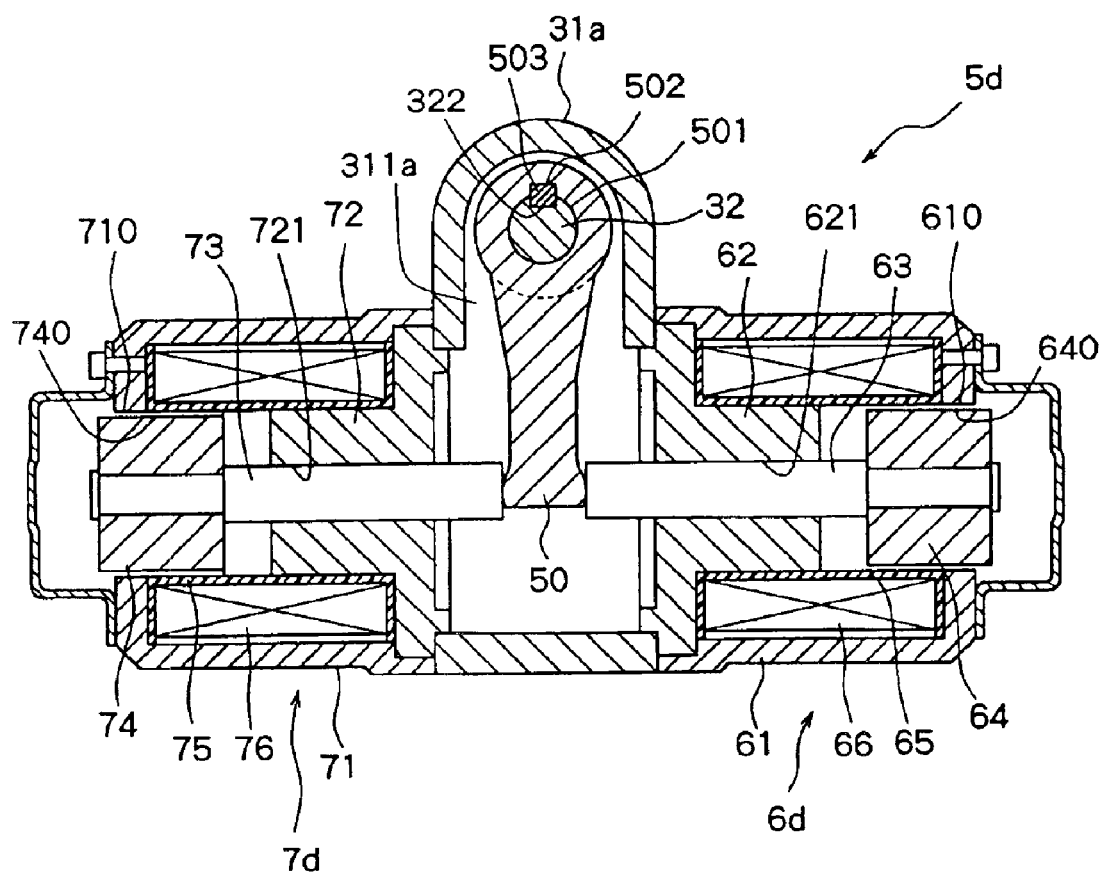
FIG. 11 is a sectional view illustrating the shift actuator constituted according to a fifth embodiment of the present invention.
Figure 12:
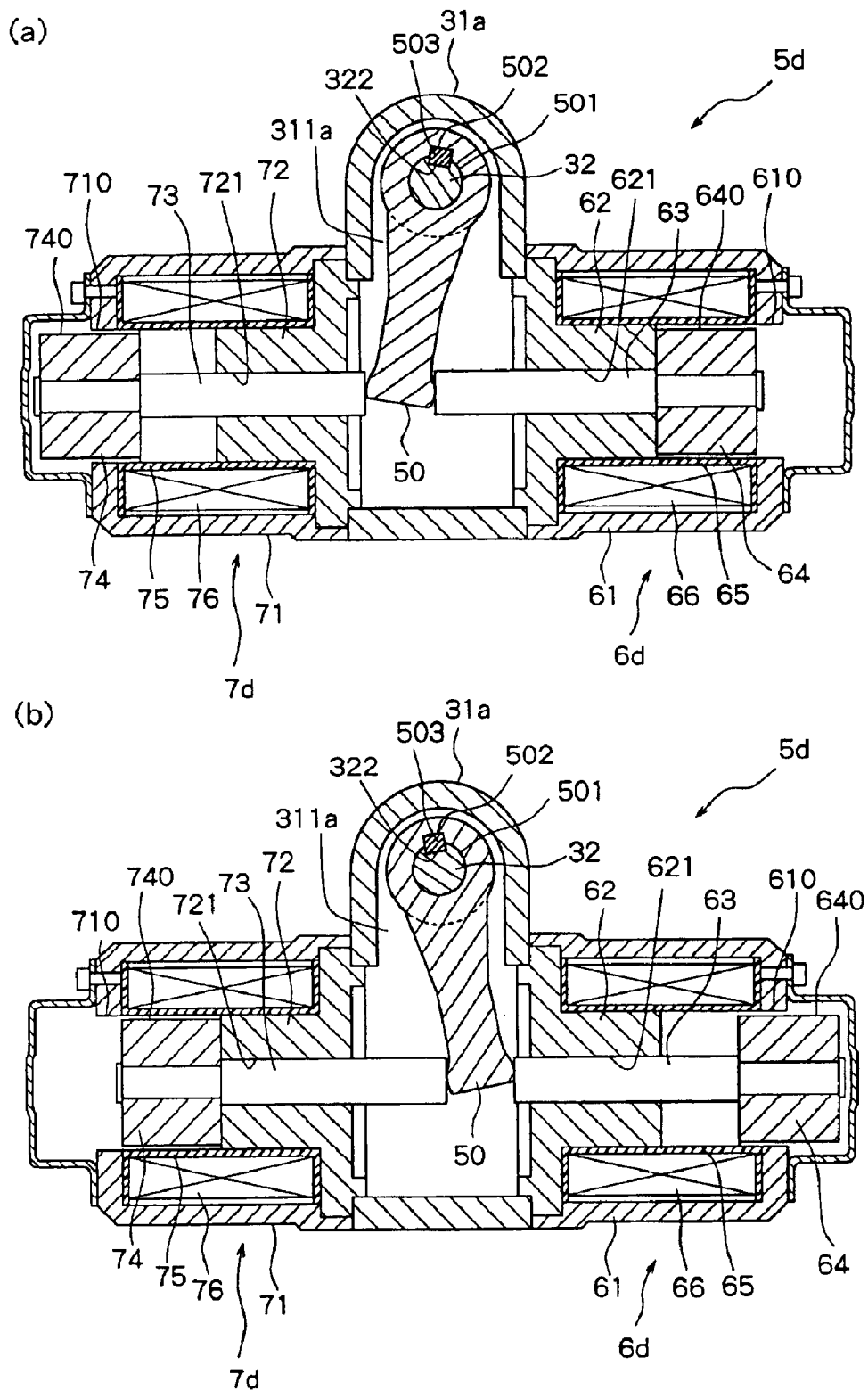
FIG. 12 is a view illustrating the operation states of the shift actuator according to the fifth embodiment shown in FIG. 11.

Next, a fifth embodiment of the shift actuator constituted according to the present invention will be described with reference to FIGS. 11 and 12. In the shift actuator 5d of the fifth embodiment shown in FIGS. 11 and 13, the same members as those of the first embodiment shown in FIG. 4 are denoted by the same reference numerals but are not described again in detail.

The shift actuator 5d according to the fifth embodiment has features as described below. That is, in the fixed iron core 62 and the moving iron core 64 constituting the first electromagnetic solenoid 6d, the opposing areas of the outer peripheral surface 640 of the moving iron core 64 and the inner peripheral surface 610 of the casing 61 that works as the fixed yoke are so constituted as to decrease, at a position where the attraction ends shown in FIG. 12(a) after the moving iron core 64 is attracted by the fixed iron core 62 as a result of supplying the current to the electromagnetic coil 66. In the illustrated embodiment, the outer peripheral surface 640 of the moving iron core 64 is opposed to the entire inner peripheral surface 610 of the casing 61 that works as the fixed yoke when the shift actuator 5a is in the neutral state shown in FIG. 11 and when the shift actuator 5a is operated by the second electromagnetic solenoid 7d as will be described later with reference to FIG. 12(b). In the illustrated embodiment, further, the opposing area is so constituted as to become zero (0) between the outer peripheral surface 640 of the moving iron core 64 and the inner peripheral surface 610 of the casing 61 working as the fixed yoke, at a position where attraction ends shown in FIG. 12(a) after the moving iron core 64 is attracted by the fixed iron core 62.

Further, in the fixed iron core 72 and the moving iron core 74 constituting the second electromagnetic solenoid 7d, the opposing areas of the outer peripheral surface 740 of the moving iron core 74 and the inner peripheral surface 710 of the casing 71 working as the fixed yoke are so constituted as to decrease, at a position where the attraction ends shown in FIG. 12(b) after the moving iron core 74 is attracted by the fixed iron core 72 as a result of supplying the current to the electromagnetic coil 76. In the illustrated embodiment, the outer peripheral surface 740 of the moving iron core 74 is entirely opposed to the inner peripheral surface 710 of the casing 71 that works as the fixed yoke when the shift actuator 5 is in the neutral state shown in FIG. 11 and when the shift actuator 5 is operated by the first electromagnetic solenoid 6 as shown in FIG. 12(a). In the illustrated embodiment, further, the opposing area is constituted as to become zero (0) between the outer peripheral surface 740 of the moving iron core 74 and the inner peripheral surface 710 of the casing 71 working as the fixed yoke, at a position where attraction ends shown in FIG. 12(b) after the moving iron core 74 is attracted by the fixed iron core 72.

The shift actuator 5d according to the fifth embodiment is constituted as described above. Described below with reference to FIGS. 8, 13 and 19 are a relationship between the operation positions of the first electromagnetic solenoid 6d and of the second electromagnetic solenoid 7d and the corresponding shift stroke positions of the synchronizing device with which the transmission (not shown) is furnished, as well as the thrusts at the operation positions of the first electromagnetic solenoid 6 and of the second electromagnetic solenoid 7.

Figure 13:
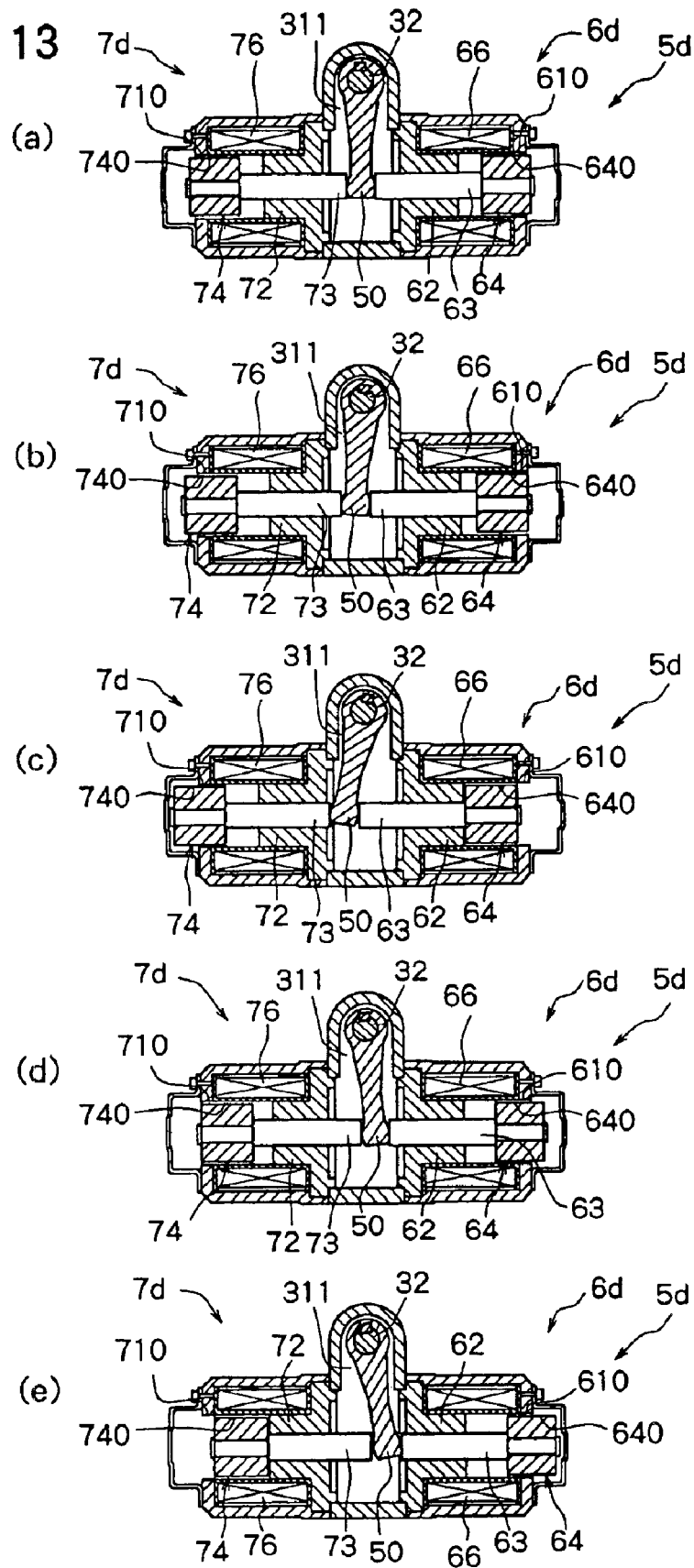
FIG. 13 is a view illustrating the operation states of the shift actuator according to the fifth embodiment shown in FIG. 11.

FIG. 13 illustrates the operation states of the first electromagnetic solenoid 6d and of the second electromagnetic solenoid 7d. In FIG. 13, FIG. 13(a) illustrates a state where the synchronizing device is brought to a neutral position, FIG. 13(b) illustrates a state where the synchronizing device is brought to a synchronizing position by the first electromagnetic solenoid 6d, FIG. 13(c) illustrates a state where the synchronizing device is brought to a gear-engaging position by the first electromagnetic solenoid 6d, FIG. 13(d) illustrates a state where the synchronizing device is brought to a synchronizing position by the second electromagnetic solenoid 7d, and FIG. 13(e) illustrates a state where the synchronizing device is brought to a gear-engaging position by the second electromagnetic solenoid 7d.

FIG. 19 is a diagram illustrating a relationship between the thrusts and the operation positions of operation rods 63 and 73 of the first electromagnetic solenoid 6d and of the second electromagnetic solenoid 7d. In FIGS. 19(a) and 19(b), the operation position P0 of the electromagnetic solenoid shows a state where the first electromagnetic solenoid 6d and the second electromagnetic solenoid 7d are in the neutral state shown in FIG. 13(a), PR2 shows a state where the first electromagnetic solenoid 6d and the second electromagnetic solenoid 7d are at the gear-engaging position shown in FIG. 13(e), and PL2 shows a state where the first electromagnetic solenoid 6d and the second electromagnetic solenoid 7d are at the gear-engaging position shown in FIG. 13(c). FIG. 19(a) is a graph illustrating the thrust at each of the operation positions of when the first electromagnetic solenoid 6d is energized to be operated from a state where the first electromagnetic solenoid 6d and the second electromagnetic solenoid 7d are in the gear-engaged state PR2 shown in FIG. 13(e) up to the gear-engaging position PL2 shown in FIG. 13(c). FIG. 19(b) is a graph illustrating the thrust at each of the operation positions of when the second electromagnetic solenoid 7d is energized to be operated from a state where the first electromagnetic solenoid 6d and the second electromagnetic solenoid 7d are in the gear-engaged state PL2 shown in FIG. 13(c) up to the gear-engaging position PR2 shown in FIG. 13(e). In FIGS. 19(a) and 19(b), the solid lines indicate thrust characteristics of the first electromagnetic solenoid 6d and of the second electromagnetic solenoid 7d constituting the shift actuator 5d of the fifth embodiment, and the broken lines indicate thrust characteristics of when the conventionally employed electromagnetic solenoids are applied to the shift actuator.

First, described below with reference to FIG. 19(a) is the thrust at each of the operation positions (graph indicated by the solid line) of when the first electromagnetic solenoid 6d is energized to be operated from a state where the first electromagnetic solenoid 6d and the second electromagnetic solenoid 7d are in the gear-engaged state PR2 shown in FIG. 8(e) up to the gear-engaging position PL2 shown in FIG. 8(c). The thrust characteristics of when the conventionally used electromagnetic solenoids are applied to the shift actuator are such that the thrust sharply increases as indicated by the broken line as the operation position approaches the end of the stroke (PL2) from the position where the stroke starts (PR2) (as the moving iron core approaches the fixed iron core).

In the shift actuator 5d of the fifth embodiment, when an electric current is supplied to the electromagnetic coil 66 of the first electromagnetic solenoid 6d in the gear-engaged state shown in FIG. 13(e) (gear-engaged state shown in FIG. 8(e) in the case of the synchronizing device), the moving iron core 64 is attracted by the fixed iron core 62 to produce a thrust on the operation rod 63. At the gear-engaging position PR2 (stroke start position), however, the thrust is small since the gap is large between the moving iron core 64 and the fixed iron core 62. The thrust increases as the moving iron core 64 moves toward the fixed iron core 62. The thrust increases, like that of the conventional counterpart as indicated by the broken line, until the synchronized state represented by PL1 in FIG. 20(a) is reached, i.e., until the synchronized state shown in FIG. 13(b) is reached (until the synchronized state shown in FIG. 8(b) is reached in the case of the synchronizing device) past the neutral position represented by P0 in FIG. 19(a), i.e., past the neutral state shown in FIG. 13(a) (past the neutral state shown in FIG. 8(a) in the case of the synchronizing device). In the shift actuator 5d according to the fifth embodiment, the right end of the outer peripheral surface 640 of the moving iron core 64 comes into agreement with the right end of the inner peripheral surface 610 of the casing 61 that works as a fixed yoke at the synchronizing position PL1, as shown in FIG. 13(b).

As the moving iron core 64 moves toward the fixed iron core 62 from the synchronized state shown in FIGS. 13(b) and 8(b), the opposing areas decrease between the outer peripheral surface 640 of the moving iron core 64 and the inner peripheral surface 610 of the casing 61 working as the fixed yoke. As a result, reluctance increases between the casing 61 working as the fixed yoke and the moving iron core 64, and the magnetic flux density decreases in the attraction portion (opposing surfaces of the fixed iron core 62 and of the moving iron core 64). Therefore, though the gap between the moving iron core 64 and the fixed iron core 62 becomes small after having passed the synchronizing position PL1, the thrust of the first electromagnetic solenoid 6d does not sharply increase and arrives at the gear-engaging position (end of stroke) represented by PL2, i.e., arrives at the gear-engaged state shown in FIG. 13(c) (gear-engaged state shown in FIG. 8(c) in the case of the synchronizing device) at a relatively smaller value compared with that of the broken line of the prior art, as shown in FIG. 19(a).

Next, described below with reference to FIG. 19(b) is the thrust at each of the operation positions (graph indicated by the solid line) of when the second electromagnetic solenoid 7d is energized to be operated from a state where the first electromagnetic solenoid 6d and the second electromagnetic solenoid 7d are in the gear-engaged state PL2 shown in FIG. 13(c) up to the gear-engaging position PR2 shown in FIG. 13(e). When an electric current is supplied to the electromagnetic coil 76 of the second electromagnetic solenoid 7d in the gear-engaged state shown in FIG. 13(c) (gear-engaged state shown in FIG. 8(c) in the case of the synchronizing device), the moving iron core 74 is attracted by the fixed iron core 72 to produce a thrust on the operation rod 73. At the gear-engaging position PL2 (stroke start position), however, the thrust is small since the gap is large between the moving iron core 74 and the fixed iron core 72. The thrust increases as the moving iron core 74 moves toward the fixed iron core 72. The thrust increases, like that of the conventional counterpart as indicated by the broken line, until the synchronizing state represented by PL1 in FIG. 19(b) is reached, i.e., until the synchronized state shown in FIG. 13(d) is reached (until the synchronized state shown in FIG. 8(d) is reached in the case of the synchronizing device) past the neutral position represented by P0 in FIG. 19(b), i.e., past the neutral state shown in FIG. 13(a) (past the neutral state shown in FIG. 8(a) in the case of the synchronizing device). In the shift actuator 5d according to the fifth embodiment, the left end of the outer peripheral surface 740 of the moving iron core 74 comes into agreement with the left end of the inner peripheral surface 710 of the casing 71 that works as a fixed yoke at the synchronizing position PL1, as shown in FIG. 13(d).

As the moving iron core 74 moves toward the fixed iron core 72 from the synchronized state shown in FIGS. 13(d) and 8(d), the opposing areas decrease between the outer peripheral surface 740 of the moving iron core 74 and the inner peripheral surface 710 of the casing 71 working as the fixed yoke. As a result, reluctance increases between the casing 71 working as the fixed yoke and the moving iron core 74, and the magnetic flux density decreases in the attraction portion (opposing surfaces of the fixed iron core 72 and of the moving iron core 67). Therefore, though the gap between the moving iron core 74 and the fixed iron core 72 becomes small after having passed the synchronizing position PL1, the thrust of the first electromagnetic solenoid 7d does not sharply increase and arrives at the gear-engaging position (end of stroke) represented by PR2, i.e., arrives at the gear-engaged state shown in FIG. 13(e) (gear-engaged state shown in FIG. 8(e) in the case of the synchronizing device) at a relatively smaller value compared with that of the broken line of the prior art, as shown in FIG. 19(b).

As described above, the shift actuator 5d according to the fifth embodiment comprises the first electromagnetic solenoid 6d and the second electromagnetic solenoid 7d for actuating the operation lever 50 (operation member) coupled to the shift lever 34 in the directions opposite to each other. Therefore, the shift actuator features improved durability since it has no rotary mechanism and features a compact constitution and an increased operation speed since it needs no speed reduction mechanism constituted by a ball-screw mechanism or a gear mechanism that is employed by the actuator that uses an electric motor. Further, the shift actuator 5d according to the fifth embodiment is so constituted that opposing areas of the outer peripheral surface 640 or 740 of the moving iron core 64 or 74 and the inner peripheral surface 610 or 710 of the casing 61 or 71 working as a fixed yoke decrease, at a position where the attraction ends as shown in FIGS. 12(a) and 12(b). Therefore, the reluctance increases between the casing 61 or 71 that works as the fixed yoke and the moving iron core 64 or 74, and the magnetic flux density decreases in the attraction portion, enabling the thrust to be decreased at the end of the stroke of the first electromagnetic solenoid 6d or the second electromagnetic solenoid 7d. It is therefore allowed to soften the impact on the moving iron cores 64, 74 and on the clutch sleeves of the synchronizing device at the end of the stroke.

Figure 14:
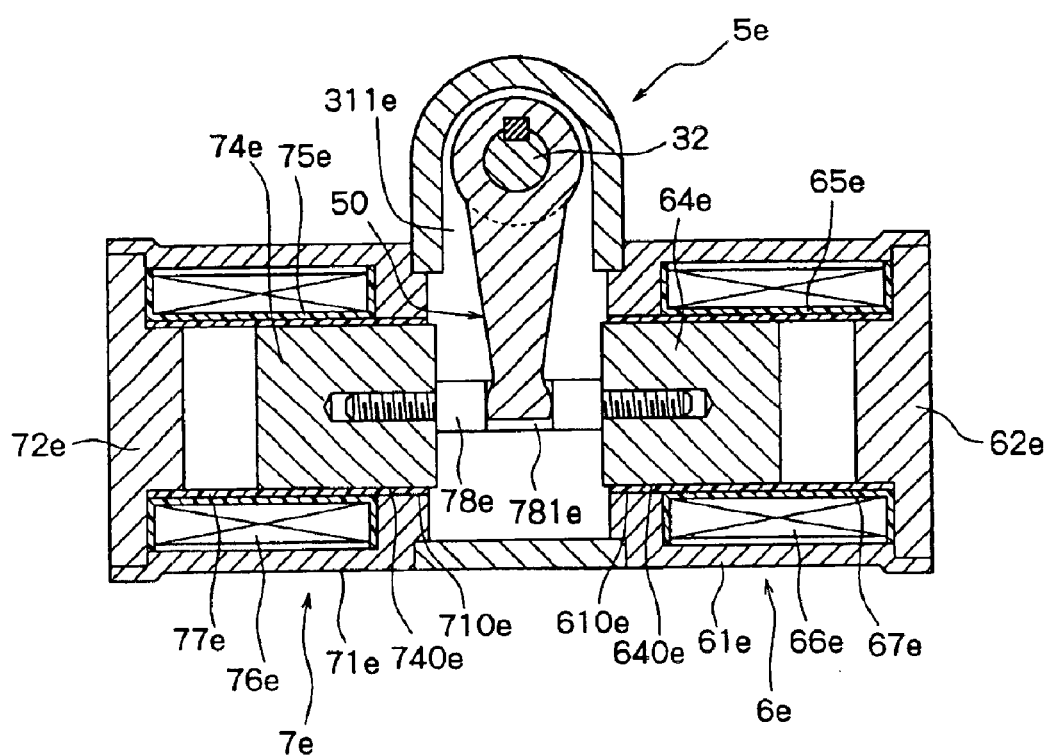
FIG. 14 is a sectional view illustrating the shift actuator constituted according to a sixth embodiment of the present invention.

Next, the shift actuator constituted according to a sixth embodiment of the present invention will be described with reference to FIGS. 14 and 15. In the shift actuator 5e according to the sixth embodiment shown in FIGS. 14 and 15, the members same as those of the above-mentioned embodiments are denoted by the same reference numerals and their description is not repeated.

The shift actuators of the fifth embodiment are of the pushing type. The shift actuator 5e of the sixth embodiment shown in FIGS. 14 and 15, however, is of the pulling type. That is, the shift actuator 5e according to the sixth embodiment has a first electromagnetic solenoid 6e and a second electromagnetic solenoid 7e for actuating, in the directions opposite to each other, the operation lever 50 mounted on the control shaft 32. The first electromagnetic solenoid 6e comprises a casing 61e, an electromagnetic coil 66e wound on a bobbin 65e that is disposed in the casing 61e and is made of a nonmagnetic material such as a synthetic resin, a fixed iron core 62e disposed in the electromagnetic coil 66e, a moving iron core 64e that is made of a magnetic material and is disposed to be allowed to approach, and separate away from, the fixed iron core 62e, and a cylindrical slide guide 67e that is made of a suitable synthetic resin and is disposed on the inside of the bobbin 65e to guide the motion of the moving iron core 64e. In the illustrated embodiment, the casing 61e is made of the magnetic material, has an inner peripheral surface 610e opposed to the outer peripheral surface 640e of the moving iron core 64e, and is constituted to work as a fixed yoke.

The second electromagnetic solenoid 7e is disposed opposed to the first electromagnetic solenoid 6e. Like the first electromagnetic solenoid 6e, the second electromagnetic solenoid 7e, too, comprises a casing 71e, an electromagnetic coil 76e wound on a bobbin 75e that is disposed in the casing 71e and is made of a nonmagnetic material such as a synthetic resin, a fixed iron core 72e disposed in the electromagnetic coil 76e, a moving iron core 74e that is made of a magnetic material and is disposed to be allowed to approach, and separate away from, the fixed iron core 72e, and a cylindrical slide guide 77e that is made of a suitable synthetic resin and is disposed on the inside of the bobbin 75e to guide the motion of the moving iron core 74e. Like the casing 61e, the casing 71e, too, is made of the magnetic material, has an inner peripheral surface 710e opposed to the outer peripheral surface 740e of the moving iron core 74e, and works as a fixed yoke. In the shift actuator 5e of the sixth embodiment, the moving iron core 64e of the first electromagnetic solenoid 6e and the moving iron core 74e of the second electromagnetic solenoid 7e are coupled together by an operation rod 78e. A groove 781e is formed in the central portion of the operation rod 78e, and an end of the operation lever 50 is brought into engagement with the groove 781e.

The shift actuator 5e according to the sixth embodiment is constituted as described above. The operation will now be described below.

When an electric current is supplied to the electromagnetic coil 76e of the second electromagnetic solenoid 7e, the moving iron core 74e is attracted by the fixed iron core 72e as shown in FIG. 15(a). As a result, the operation rod 78e coupled to the moving iron core 74e moves toward the left in FIG. 15, causing the control shaft 32 to turn clockwise via the operation lever 50 of which the end is fitted to the groove 781e formed in the central portion of the operation rod 78e. Therefore, the shift lever 34 constituted integratedly with the shift sleeve 35 mounted on the control shaft 32, is shifted in one direction. Here, the areas opposing to each other of the fixed iron core 72e and the moving iron core 74e are so constituted as to decrease, at a position where the attraction ends shown in FIG. 15(a) after the moving iron core 74e is attracted by the fixed iron core 72e as a result of supplying a current to the electromagnetic coil 76e. In the illustrated embodiment, the outer peripheral surface 740e of the moving iron core 74e is opposed to the entire inner peripheral surface 710e of the casing 71e that works as the fixed yoke when the shift actuator 5e is in the neutral state shown in FIG. 14 and when the shift actuator 5e is operated by the first electromagnetic solenoid 6e as will be described later with reference to FIG. 15(b). In the illustrated embodiment, further, the opposing area is so constituted as to become zero (0) between the outer peripheral surface 740e of the moving iron core 74e and the inner peripheral surface 710e of the casing 71e working as the fixed yoke, at a position where attraction ends shown in FIG. 15(a) after the moving iron core 74e is attracted by the fixed iron core 72e.

Further, when the electric current is supplied to the electromagnetic coil 66e of the first electromagnetic solenoid 6e, the moving iron core 64e is attracted by the fixed iron core 62e. As a result, the operation rod 78e coupled to the moving iron core 64e moves toward the right in FIG. 14, causing the control shaft 32 to turn counter clock wise via the operation lever 50 of which the end is fitted to the groove 781a formed in the central portion of the operation rod 78a. Therefore, the shift lever 34 constituted integratedly with the shift sleeve 35 mounted on the control shaft 32, is shifted in the other direction. Here, the areas opposing to each other of the fixed iron core 62e and the moving iron core 64e are so constituted as to decrease, at a position where the attraction ends shown in FIG. 15(b) after the moving iron core 64e is attracted by the fixed iron core 62e as a result of supplying a current to the electromagnetic coil 66e. In the illustrated embodiment, the outer peripheral surface 640e of the moving iron core 64e is opposed to the entire inner peripheral surface 610e of the casing 61e that works as the fixed yoke when the shift actuator 5e is in the neutral state shown in FIG. 14 and when the shift actuator 5e is operated by the second electromagnetic solenoid 7e as shown in FIG. 15(a). In the illustrated embodiment, further, the opposing area is so constituted as to become zero (0) between the outer peripheral surface 640e of the moving iron core 64e and the inner peripheral surface 610e of the casing 61e working as the fixed yoke, at a position where attraction ends shown in FIG. 15(b) after the moving iron core 64e is attracted by the fixed iron core 62e.

Like the shift actuator 5d of the fifth embodiment as described above, the shift actuator 5e according to the sixth embodiment is so constituted that opposing areas of the outer peripheral surface 740e or 640e of the moving iron core 74e or 64e and the inner peripheral surface 710e or 610e of the casing 71d or 61e working as a fixed yoke decrease, at a position where the attraction ends, as shown in FIGS. 15(a) and 15(b). Therefore, the reluctance increases between the casing 71e or 61e that works as the fixed yoke and the moving iron core 74e or 64e, and the magnetic flux density decreases in the attraction portion, enabling the thrust to be decreased at the end of the stroke of the second electromagnetic solenoid 7e or the first electromagnetic solenoid 6e. It is therefore allowed to soften the impact on the moving iron cores 74e, 64e and on the clutch sleeves of the synchronizing device at the end of the stroke.

Figure 16:
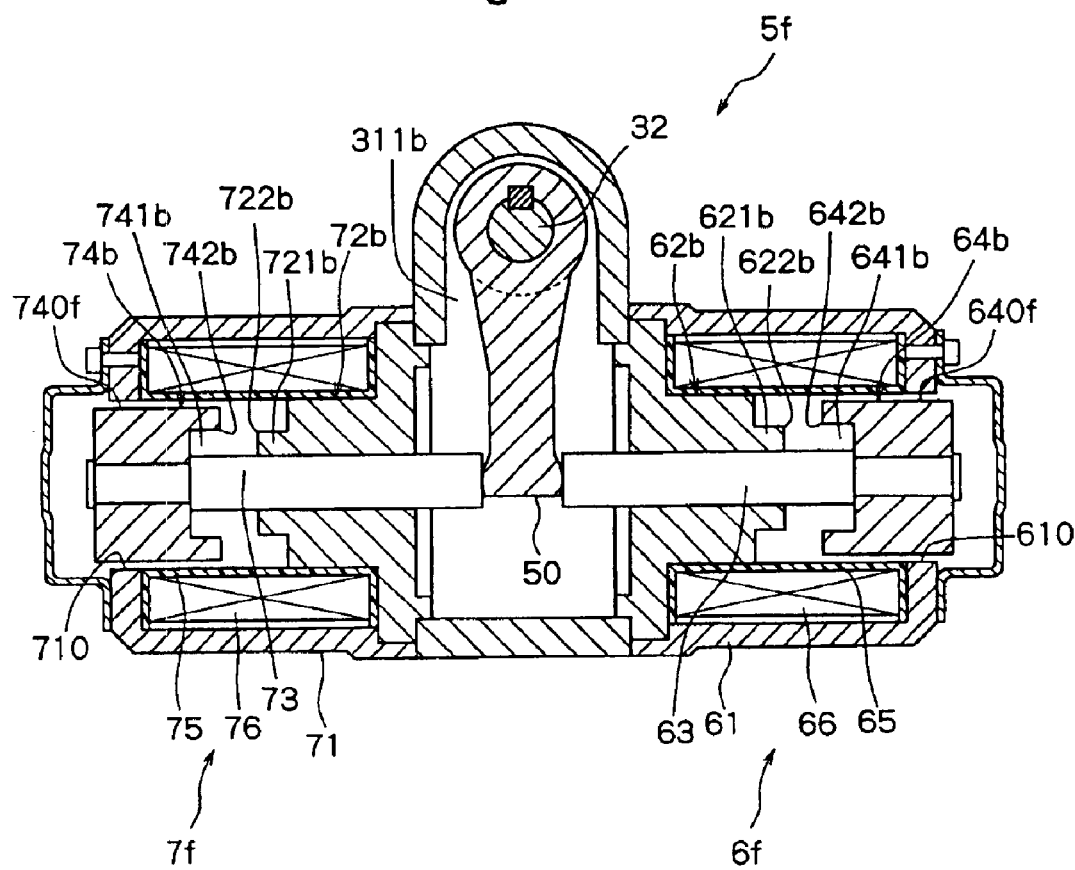
FIG. 16 is a sectional view illustrating the shift actuator constituted according to a seventh embodiment of the present invention.
Figure 17:
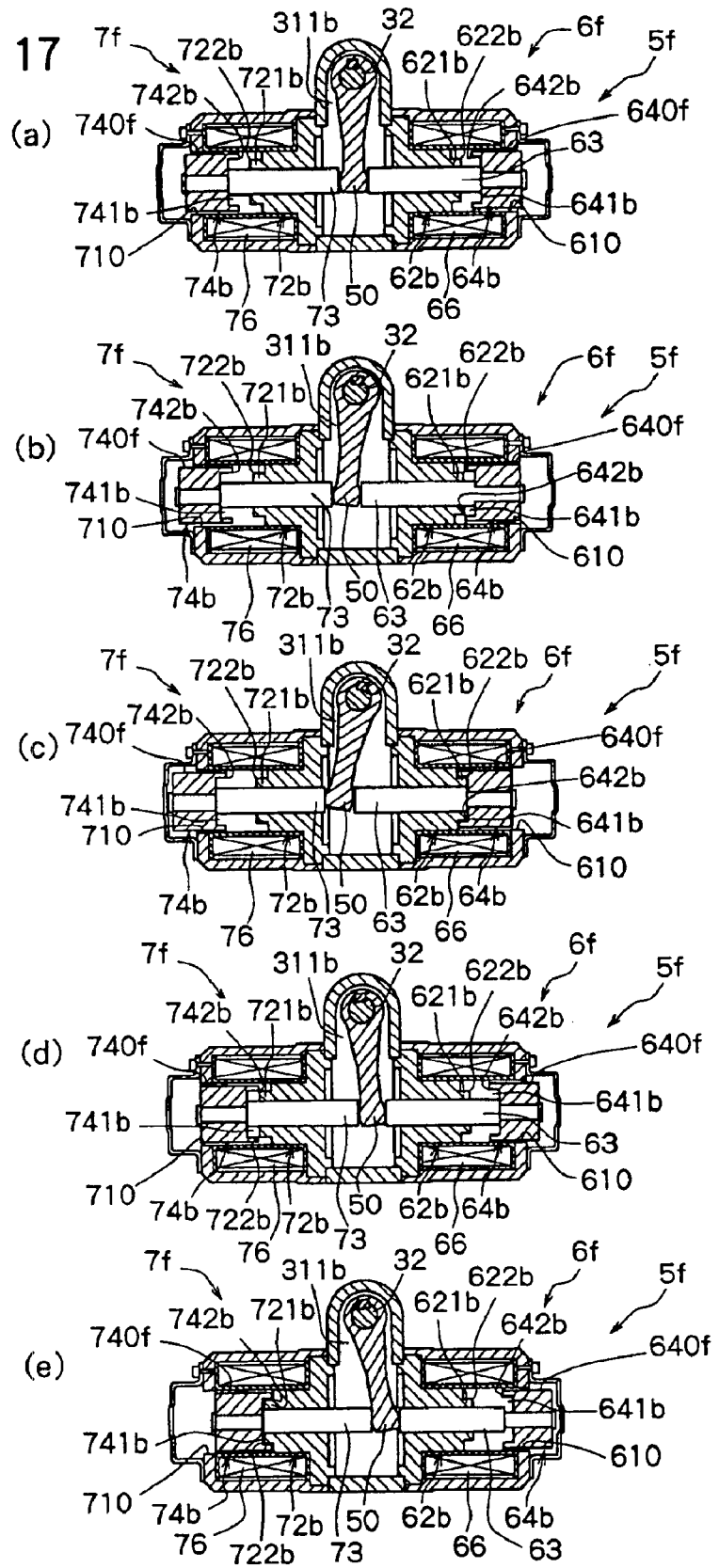
FIG. 17 is a view illustrating the operation states of the shift actuator according to the seventh embodiment shown in FIG. 16.

Next, the shift actuator constituted according to a seventh embodiment of the present invention will be described with reference to FIGS. 16 and 17. The shift actuator 5f shown in FIGS. 16 and 17 is mechanically substantially the same as the shift actuator 5b of the third embodiment shown in FIG. 6. Therefore, the same members are denoted by the same reference numerals and their description is not repeated.

The shift actuator 5f according to the seventh embodiment has a feature in that the feature of the shift actuator 5d of the fifth embodiment is applied to the shift actuator 5b of the third embodiment.

That is, opposing areas of the fixed iron core 62b and the moving iron core 64b constituting the first electromagnetic solenoid 6f are so constituted as to decrease, at a position where the attraction ends shown in FIG. 17(c) after the moving iron core 64b is attracted by the fixed iron core 62b as a result of supplying a current to the electromagnetic coil 66. In the illustrated embodiment, the outer peripheral surface 640f of the moving iron core 64b is opposed to the entire inner peripheral surface 610 of the casing 61 that works as the fixed yoke when the shift actuator 5f is in the neutral state shown in FIGS. 16 and 17(a) and when the shift actuator 5f is operated by the second electromagnetic solenoid 7f that will be described later. In the illustrated embodiment, further, the opposing area is so constituted as to be come zero (0) between the outer peripheral surface 640f of the moving iron core 64b and the inner peripheral surface 610 of the casing 61 working as the fixed yoke, at a position where attraction ends shown in FIG. 17(c) after the moving iron core 64b is attracted by the fixed iron core 62b.

Further, the opposing areas of the fixed iron core 72b and the moving iron core 74b constituting the second electromagnetic solenoid 7f are so constituted as to decrease, at a position where the attraction ends shown in FIG. 17(e) after the moving iron core 74b is attracted by the fixed iron core 72b as a result of supplying a current to the electromagnetic coil 76. In the illustrated embodiment, the outer peripheral surface 740f of the moving iron core 74b is opposed to the entire inner peripheral surface 710 of the casing 71 that works as the fixed yoke when the shift actuator 5f is in the neutral state and when the shift actuator 5f is operated by the first electromagnetic solenoid 6f as shown in FIGS. 16 and 17(a). In the illustrated embodiment, further, the opposing area is so constituted as to be come zero (0) between the outer peripheral surface 740f of the moving iron core 74b and the inner peripheral surface 710 of the casing 71 working as the fixed yoke, at a position where attraction ends shown in FIG. 17(e) after the moving iron core 74b is attracted by the fixed iron core 72b.

The shift actuator 5f according to the seventh embodiment is constituted as described above. Described below with reference to FIGS. 17, 19 and 8 are a relationship between the operation positions of the first electromagnetic solenoid 6f and of the second electromagnetic solenoid 7f and the corresponding shift stroke positions of the synchronizing device with which the transmission (not shown) is furnished, as well as the thrusts at the operation positions of the first electromagnetic solenoid 6f and of the second electromagnetic solenoid 7f.

FIG. 17 illustrates the operation states of the first electromagnetic solenoid 6f and of the second electromagnetic solenoid 7f. In FIG. 17, FIG. 17(a) illustrates a state where the synchronizing device is brought to a neutral position, FIG. 17(b) illustrates a state where the synchronizing device is brought to a synchronizing position by the first electromagnetic solenoid 6f, FIG. 17(c) illustrates a state where the synchronizing device is brought to a gear-engaging position by the first electromagnetic solenoid 6f, FIG. 17(d) illustrates a state where the synchronizing device is brought to a synchronizing position by the second electromagnetic solenoid 7f, and FIG. 17(e) illustrates a state where the synchronizing device is brought to a gear-engaging position by the second electromagnetic solenoid 7f.

First, described below with reference to FIG. 19(a) is the thrust at each of the operation positions (graph indicated by a dot-and-dash line) of when the first electromagnetic solenoid 6f is energized to be operated from a state where the first electromagnetic solenoid 6f and the second electromagnetic solenoid 7f are in the gear-engaged state PR2 shown in FIG. 17(e) up to the gear-engaging position PL2 shown in FIG. 17(c). When an electric current is supplied to the electromagnetic coil 66 of the first electromagnetic solenoid 6f in the gear-engaged state shown in FIG. 17(e) (gear-engaged state shown in FIG. 8(e) in the case of the synchronizing device), the moving iron core 64b is attracted by the fixed iron core 62b to produce a thrust on the operation rod 63. At the gear-engaging position PR2 (stroke start position), however, the thrust is small since the gap is large between the moving iron core 64b and the fixed iron core 62b. The thrust increases as the moving iron core 64b moves toward the fixed iron core 62b. As the neutral position represented by P0 in FIG. 19(a) is passed, i.e., as the neutral state shown in FIG. 17(a) is passed (as the neutral state shown in FIG. 8(a) is passed in the case of the synchronizing device), the edge 642b of the recess 641b of the moving iron core 64b approaches the edge 622b of the protuberance 621b of the fixed iron core 62b. At the synchronizing position represented by PL1 in FIG. 19(a), i.e., in the synchronized state shown in FIG. 17(b) (in the synchronized state shown in FIG. 8(b) in the case of the synchronizing device), the two edges most approach each other. In the synchronized state shown in FIG. 17(b), the thrust increases since the magnetic flux density increases at the two edges. At this moment, the right end of the outer peripheral surface 640f of the moving iron core 64b comes into agreement with, or is positioned slightly to the right side of, the right end of the inner peripheral surface 610 of the casing 61 that works as the fixed yoke, as shown in FIG. 17(b).

When the synchronizing position represented by PL1 in FIG. 19(a) is passed, there is established a state where the recess 621b of the moving iron core 64b fits to the protuberance 641b of the fixed iron core 62b. At this fitting portion, the magnetic flux acts in the radial direction and hence, the thrust decreases. As the moving iron core 64b further approaches the fixed iron core 62b, the thrust increases and arrives at the gear-engaged state (end of the stroke) represented by PL2 in FIG. 19(a), i.e., arrives at the gear-engaged state shown in FIG. 17(c) (gear-engaged state shown in FIG. 8(c) in the case of the synchronizing device Here, in a range from the synchronizing position represented by PL1 to the gear-engaging position (end of the stroke) represented by PL2, the opposing areas of the outer peripheral surface 640f of the moving iron core 64b and the inner peripheral surface 610 of the casing 61 working as a fixed yoke are so constituted as to gradually decrease. Therefore, reluctance increases between the moving iron core 64b and the casing 61 working as the fixed yoke, and the magnetic flux density decreases in the attraction portion, making it possible to decrease the thrust at the end of the stroke of the first electromagnetic solenoid 6b. It is therefore allowed to soften the impact on the moving iron core 64b and on the clutch sleeves of the synchronizing device at the end of the stroke.

Next, described below with reference to FIG. 19(b) is the thrust at each of the operation positions (graph indicated by a dot-and-dash line) of when the second electromagnetic solenoid 7b is energized to be operated from a state where the first electromagnetic solenoid 6f and the second electromagnetic solenoid 7f are in the gear-engaged state PL2 shown in FIG. 17(c) up to the gear-engaging position PR2 shown in FIG. 17(e). When an electric current is supplied to the electromagnetic coil 76 of the second electromagnetic solenoid 7f in the gear-engaged state shown in FIG. 17(c) (gear-engaged state shown in FIG. 8(c) in the case of the synchronizing device), the moving iron core 74b is attracted by the fixed iron core 72b to produce a thrust on the operation rod 73. At the gear-engaging position PL2 (stroke start position), however, the thrust is small since the gap is large between the moving iron core 74b and the fixed iron core 72b. The thrust increases as the moving iron core 74b moves toward the fixed iron core 72b. As the neutral position represented by P0 in FIG. 19(b) is passed, i.e., as the neutral state shown in FIG. 17(a) is passed (as the neutral state shown in FIG. 8(a) is passed in the case of the synchronizing device), the edge 742b of the recess 741b of the moving iron core 74b approaches the edge 722b of the protuberance 721b of the fixed iron core 72b. At the synchronizing position represented by PR1 in FIG. 19(b), i.e., in the synchronized state shown in FIG. 17(d) (in the synchronized state shown in FIG. 8(d) in the case of the synchronizing device), the two edges most approach each other. In the synchronized state shown in FIG. 17(d), the thrust increases since the magnetic flux density increases at the two edges. At this moment, the left end of the outer peripheral surface 740f of the moving iron core 74b comes into agreement with, or is positioned slightly to the right side of, the left end of the inner peripheral surface 710 of the casing 71 that works as the fixed yoke, as shown in FIG. 17(d).

When the synchronizing position represented by PR1 in FIG. 19(b) is passed, there is established a state where the recess 721b of the moving iron core 74b fits to the protuberance 741b of the fixed iron core 72b. At this fitting portion, the magnetic flux acts in the radial direction and hence, the thrust decreases. As the moving iron core 74b further approaches the fixed iron core 72b, the thrust increases and arrives at the gear-engaged state (end of the stroke) represented by PR2 in FIG. 19(b), i.e., arrives at the gear-engaged state shown in FIG. 17(e) (gear-engaged state shown in FIG. 8(e) in the case of the synchronizing device Here, in a range of from the synchronizing position represented by PR1 to the gear-engaging position (end of the stroke) represented by PR2, the opposing areas of the outer peripheral surface 740f of the moving iron core 74b and the inner peripheral surface 710 of the casing 71 working as a fixed yoke are so constituted as to gradually decrease. Therefore, reluctance increases between the moving iron core 74b and the casing 71 working as the fixed yoke, and the magnetic flux density decreases in the attraction portion, making it possible to decrease the thrust at the end of the stroke of the second electromagnetic solenoid 7b. It is therefore allowed to soften the impact on the moving iron core 74b and on the clutch sleeves of the synchronizing device at the end of the stroke.

As described above, the shift actuator 5f comprising the first electromagnetic solenoid 6f and the second electromagnetic solenoid 7f according to the seventh embodiment has such characteristics that the thrust once swells at the synchronizing positions (PL1, PR1) of the synchronizing device. Namely, a predetermined thrust is obtained at the synchronizing position where the operation force is required, making it possible to use the electromagnetic solenoids of a small size. In the shift actuator 5f according to the seventh embodiment, further, an increase in the thrust is suppressed at the end of the stroke, and the impact on the moving iron core and on the clutch sleeves of the synchronizing device at the end of the stroke is softened. The seventh embodiment shown in FIGS. 16 and 17 has dealt with a case where the invention was applied to the push-type actuator of the sixth embodiment. However, the same effect is obtained even when the present invention is applied to the pull-type actuator of the sixth embodiment.

Figure 18:
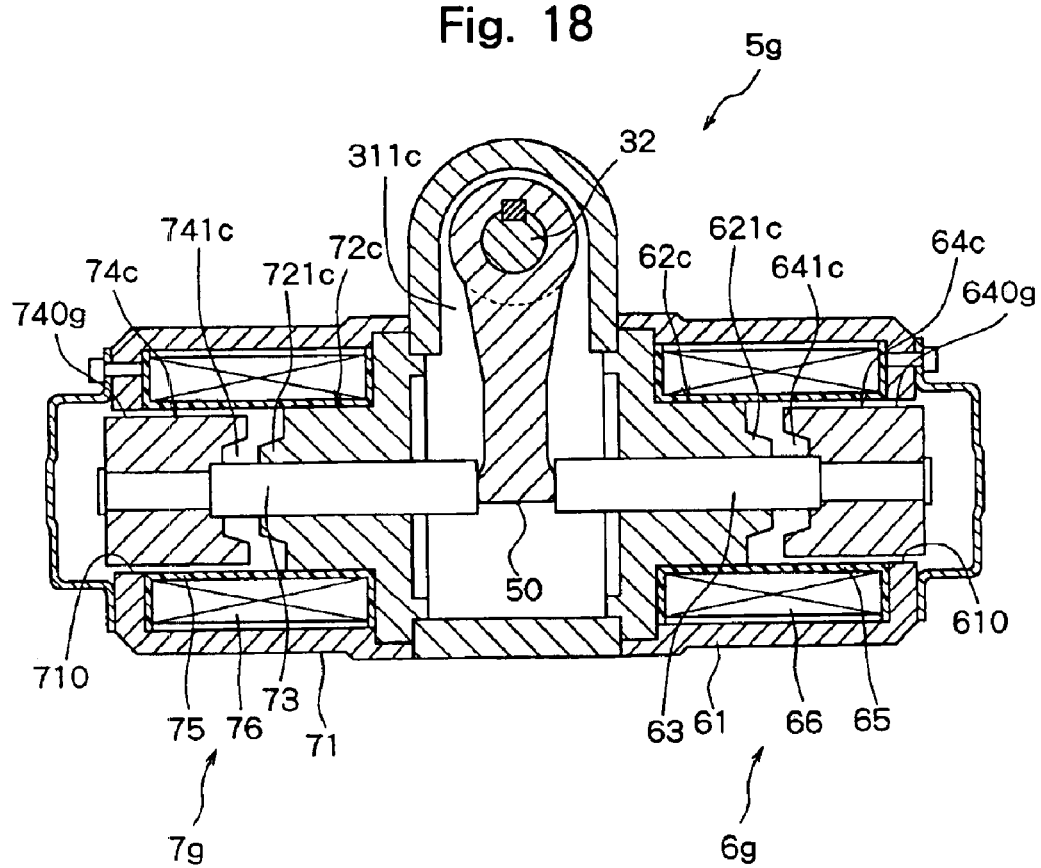
FIG. 18 is a sectional view illustrating the shift actuator constituted according to an eighth embodiment of the present invention.

Next, the shift actuator constituted according to an eighth embodiment of the present invention will be described with reference to FIG. 18. The shift actuator 5g shown in FIG. 18 is mechanically substantially the same as the shift actuator 5c of the fourth embodiment shown in FIG. 9. Therefore, the same members are denoted by the same reference numerals and their description is not repeated.

The shift actuator 5g according to the eighth embodiment has a feature in that the feature of the shift actuator 5d of the fifth embodiment and the feature of the shift actuator 5f of the seventh embodiment are applied to the shift actuator 5c of the fourth embodiment.

That is, in the shift actuator 5g of the eighth embodiment, the outer peripheral surfaces of the stepped protuberances 621c, 721c formed at the centers on the end surfaces of the fixed iron cores 62c, 72c constituting the first electromagnetic solenoid 6g and the second electromagnetic solenoid 7g, as well as the inner surfaces of the stepped recesses 641c, 741c of the moving iron cores 64c, 74c corresponding to the above protuberance 621c and 721c formed at the centers on the end surfaces of the fixed iron cores 62c and 72c are tapered. Further, the fixed iron cores 62c, 72c and the moving iron cores 64c, 74c constituting the first electromagnetic solenoid 6g and the second electromagnetic solenoid 7g are so constituted that the areas opposing to each other of the outer peripheral surfaces 640g, 740g of the moving iron cores 64c, 74c and the inner peripheral surfaces 610, 710 of the casings 61, 71 working as fixed yokes decrease, at each a position where the attraction ends. The thus constituted shift actuator 5g exhibits intermediate thrust characteristics as indicated by two-dot chain lines in FIGS. 19(a) and 19(b) lying between the thrust characteristics of the shift actuator 5f of the seventh embodiment indicated by a dot-and-dash chain line and the thrust characteristics of the actuator 5d of the fifth embodiment indicated by a solid line. The thrust characteristics approach those indicated by the solid lines when the outer peripheral surfaces of the protuberances 621c, 721c and the outer peripheral surfaces of the recesses 641c, 741c have a small tapered angle, and approach those indicated by the broken lines when the outer peripheral surfaces of the protuberances 621c, 721c and the outer peripheral surfaces of the recesses 641c, 741c have a large tapered angle.

Next, a ninth embodiment of the shift actuator constituted according to the present invention will be described with reference to FIGS. 20 and 21. In the shift actuator 5h of the ninth embodiment shown in FIGS. 20 and 21, the same members as those of the above-mentioned embodiments are denoted by the same reference numerals but are not described again in detail.

The actuator 5h according to the ninth embodiment has a first electromagnetic solenoid 6h and a second electromagnetic solenoid 7h for actuating the operation lever 50 mounted on the control shaft 32 in the directions opposite to each other.

The first electromagnetic solenoid 6h comprises an electromagnetic coil 61h, a fixed iron core 62h excited by the electromagnetic coil 61h, a first moving iron core 63h disposed to be allowed to approach, and separate away from, the fixed iron core 62h, a second moving iron core 64h fitted slidably onto the outer peripheral surface of the first moving iron core 63h, and an operation rod 65h mounted on the first moving iron core 63h.

The electromagnetic coil 61h is wound on a bobbin 66h made of a nonmagnetic material such as synthetic resin. The fixed iron core 62h is made of a magnetic material and comprises a base portion 621h, a first cylindrical attraction portion 622h that protrudes from the central portion of the base portion 621h and is positioned in the electromagnetic coil 61*h*, a cylindrical portion 623*h* protruding in the same direction as the first attraction portion 622*h* from the outer periphery of the base portion 621*h*, a second annular attraction portion 624*h* provided at an end of the cylindrical portion 623*h*, and a coil accommodation portion 624*h* formed between the first attraction portion 622*h* and the cylindrical portion 623*h*. An electromagnetic coil 61*h* wound on the bobbin 66*h* is disposed in the coil accommodation portion 625*h*. The first moving iron core 63*h* is made of a magnetic material in a cylindrical shape and is movably disposed in the electromagnetic coil 61*h*. The first moving iron core 63*h* has a mounting hole 631*h* which is formed in the central portion thereof and of which an inner diameter corresponds to the outer diameter of a small-diameter mounting portion 651*h* formed at the right portion of the operation rod 65*h* in the drawing. The first moving iron core 63*h* is mounted by fitting its mounting hole 631*h* into the mounting portion 651*h* of the operation rod 65*h*. The second moving iron core 64*h* is made of a magnetic material in an annular shape, and has a mounting hole 641*h* of an inner diameter corresponding to the outer diameter of the first moving iron core 63*h*. By slidably fitting the mounting hole 641*h* onto the outer peripheral surface of the first moving iron core 63*h*, the thus formed second moving iron core 64*h* is so disposed that the outer peripheral portion thereof is opposed to the second attraction portion 624*h* of the fixed iron core 62*h*. A snap ring 67*h* is mounted on the outer peripheral surface of the first moving iron core 63*h* at the central portion thereof in the axial direction. The snap ring 67*h* limits the second moving iron core 64*h* from moving toward the fixed iron core 62*h*. Therefore, the snap ring 67*h* serves as a limiting means for limiting the second moving iron core 64*h* from moving toward the fixed iron core 62*h* side.

The operation rod 65*h* mounting the first moving iron core 63*h* is made of a nonmagnetic material such as stainless steel, and is disposed being inserted in a through hole 626*h* formed in the central portion of the base portion 621*h* and the first attraction portion 622*h* of the fixed iron core 62*h*.

Figure 20:
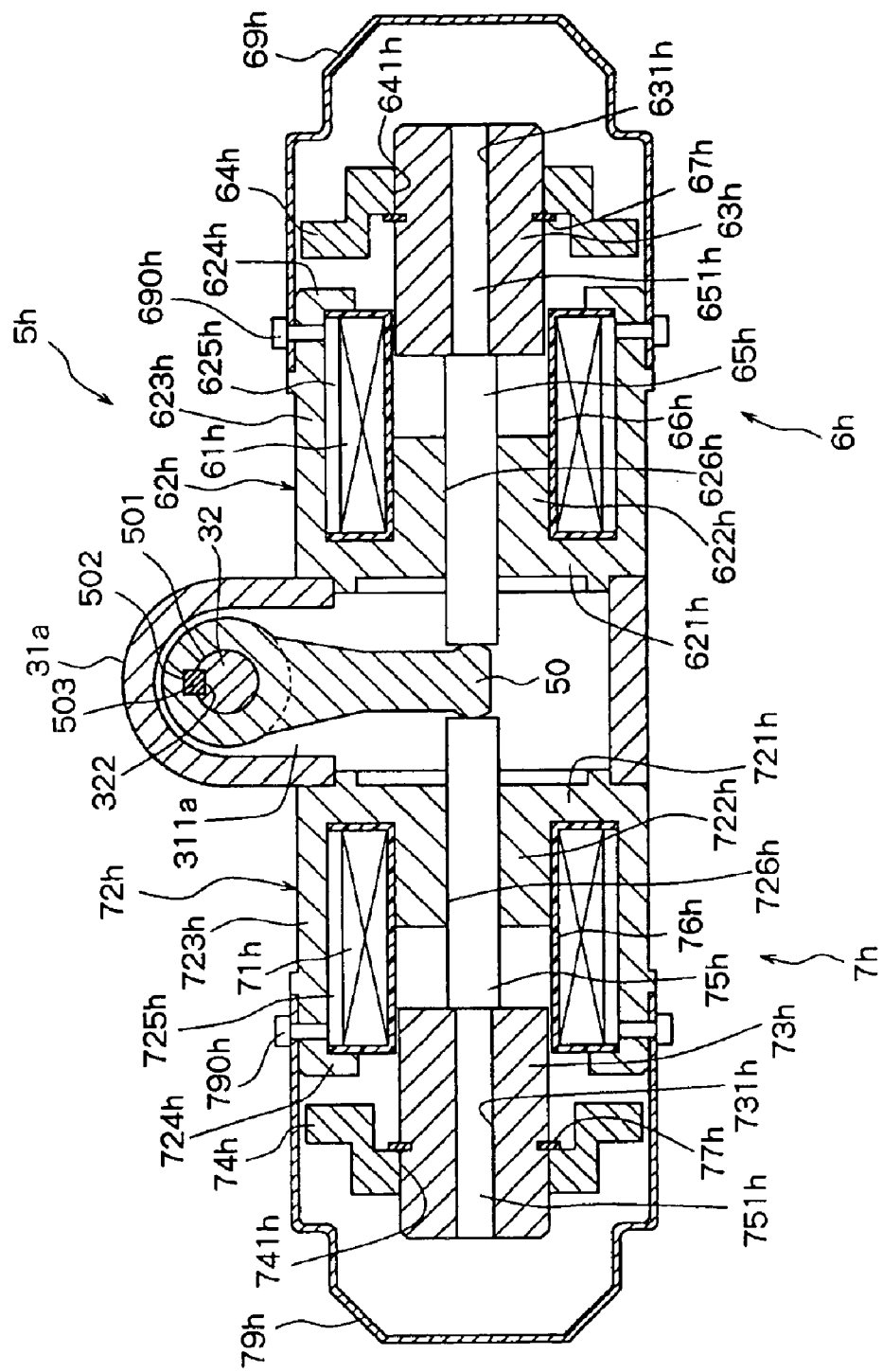
FIG. 20 is a sectional view illustrating the shift actuator constituted according to a ninth embodiment of the present invention.

A cover member 69*h* is disposed at the right end of the fixed iron core 62*h* in FIG. 20, and is mounted on a cylindrical portion 623*h* by screws 690*h*. The cover member 69*h* covers the first moving iron core 63*h* and the second moving iron core 64*h*.

When a current is supplied to the electromagnetic coil 61*h* of the thus constituted first electromagnetic solenoid 6*h*, the first moving iron core 63*h* and the second moving iron core 64*h* are attracted by the first attraction portion 622*h* and by the second attraction portion 624*h* of the fixed iron core 62*h*. As a result, the operation rod 65*h* onto which the first moving iron core 63*h* and the second moving iron core 64*h* are mounted moves toward the left in FIG. 20, and its end acts on the operation lever 50 to turn clockwise on the control shaft 32 as a center. Therefore, the shift lever 34 constituted integratedly with the shift sleeve 35 mounted on the control shaft 32 is shifted in one direction. Here, a position where the second moving ironcore 64*h* comes in contact with the second attraction portion 624*h* of the fixed iron core 62*h* in the range of stroke of the operation rod 65*h*, is so constituted as to correspond to a position just after the synchronizing position of the synchronizing device as will be described later.

The second electromagnetic solenoid 7*h* will be described next.

The second electromagnetic solenoid 7*h* is disposed to be opposed to the first electromagnetic solenoid 6*h*. Like the first electromagnetic solenoid 6*h*, the second electromagnetic solenoid 7*h*, too, comprises an electromagnetic coil 71*h*, a fixed iron core 72*h* excited by the electromagnetic coil 71*h*, a first moving iron core 73*h* disposed to be allowed to approach, and separate away from, the fixed iron core 72*h*, a second moving iron core 74*h* fitted slidably onto the outer peripheral surface of the first moving iron core 73*h*, and an operation rod 75*h* mounted on the first moving iron core 73*h*. Further, like the first electromagnetic solenoid 6*h*, the second electromagnetic solenoid 7*h*, too, comprises a bobbin 76*h* on which the electromagnetic coil 71*h* is wound, a snap ring 77*h* that is fitted onto the outer peripheral surface of the first moving iron core 73*h* and works as limiting means for limiting the second moving iron core 74*h* from moving toward the fixed iron core 72*h* side, and a cover member 79*h* for covering the first moving iron core 73*h* and the second moving iron core 74*h*.

When a current is supplied to the electromagnetic coil 71*h* of the thus constituted second electromagnetic solenoid 7*h*, the first moving iron core 73*h* and the second moving iron core 74*h* are attracted by the first attraction portion 722*h* and by the second attraction portion 724*h* of the fixed iron core 72*h*. As a result, the operation rod 75*h* to which the first moving iron core 73*h* and the second moving iron core 74*h* are mounted moves toward the right in FIG. 20, and its end acts on the operation lever 50 to turn counter clockwise on the control shaft 32 as a center. Therefore, the shift lever 34 constituted integratedly with the shift sleeve 35 mounted on the control shaft 32 is shifted in one direction. Here, a position where the second moving iron core 74*h* comes in contact with the second attraction portion 724*h* of the fixed iron core 72*h* in the range of stroke of the operation rod 75*h*, is so constituted as to correspond to a position just after the synchronizing position of the synchronizing device as will be described later.

The shift actuator 5*h* according to the ninth embodiment is constituted as described above. Described below with reference to FIGS. 21, 22 and 8 are a relationship between the operation positions of the first electromagnetic solenoid 6*h* and of the second electromagnetic solenoid 7*h* and the corresponding shift stroke positions of the synchronizing device with which the transmission (not shown) is furnished, as well as the thrusts at the operation positions of the first electromagnetic solenoid 6*h* and of the second electromagnetic solenoid 7*h*.

FIG. 21 illustrates the operation states of the first electromagnetic solenoid 6*h* and of the second electromagnetic solenoid 7*h*. In FIG. 21, FIG. 21(*a*) illustrates a state where the synchronizing device is brought to a neutral position, FIG. 21(*b*) illustrates a state where the synchronizing device is brought up to a position just after a synchronizing position by the first electromagnetic solenoid 6*h*, FIG. 21(*c*) illustrates a state where the synchronizing device is brought to a gear-engaging position by the first electromagnetic solenoid 6*h*, FIG. 21(*d*) illustrates a state where the synchronizing device is brought up to a position just after a synchronizing position by the second electromagnetic solenoid 7*h*, and FIG. 21(*e*) illustrates a state where the synchronizing device is brought to a gear-engaging position by the second electromagnetic solenoid 7*h*.

FIG. 22 is a diagram illustrating a relationship between the thrusts and the operation positions of operation rods 65*h* and 75*h* of the first electromagnetic solenoid 6*h* and of the second electromagnetic solenoid 7*h*. In FIGS. 22(*a*) and 22(*b*), the operation position P0 of the electromagnetic solenoid represents a state where the first electromagnetic solenoid 6*h* and the second electromagnetic solenoid 7*h* are in the neutral state shown in FIG. 21(a), PR2 represents a state where the first electromagnetic solenoid 6h and the second electromagnetic solenoid 7h are at the gear-engaging position shown in FIG. 21(e), PL2 represents a state where the first electromagnetic solenoid 6h and the second electromagnetic solenoid 7h are at the gear-engaging position shown in FIG. 21(c), PLM represents a state where the first electromagnetic solenoid 6h and the second electromagnetic solenoid 7h are at positions just after the synchronizing positions corresponding to the state shown in FIG. 21(b), and PRM represents a state where the first electromagnetic solenoid 6h and the second electromagnetic solenoid 7h are at positions just after the synchronizing positions corresponding to the state shown in FIG. 21(d). FIG. 22(a) is a graph illustrating the thrust at each of the operation positions of when the first electromagnetic solenoid 6h is energized to be operated from a state where the first electromagnetic solenoid 6h and the second electromagnetic solenoid 7h are in the gear-engaged state PR2 shown in FIG. 21(e) up to the gear-engaging position PL2 shown in FIG. 21(c). FIG. 22(b) is a graph illustrating the thrust at each of the operation positions of when the second electromagnetic solenoid 7h is energized to be operated from a state where the first electromagnetic solenoid 6h and the second electromagnetic solenoid 7h are in the gear-engaged state PL2 shown in FIG. 21(c) up to the gear-engaging position PR2 shown in FIG. 21(e).

First, described below with reference to FIG. 22(a) is the thrust at each of the operation positions (graph indicated by the solid line) of when the first electromagnetic solenoid 6h is energized to be operated from a state where the first electromagnetic solenoid 6h and the second electromagnetic solenoid 7h are in the gear-engaged state PR2 shown in FIG. 21(e) up to the gear-engaging position PL2 shown in FIG. 21(c).

When an electric current is supplied to the electromagnetic coil 61h of the first electromagnetic solenoid 6h in the gear-engaged state shown in FIG. 21(e) (gear-engaged state shown in FIG. 8(e) in the case of the synchronizing device the fixed iron core 62h is excited, and the first moving iron core 63h and the second moving iron core 64h are attracted by the first attraction portion 622h and by the second attraction portion 624h to produce a thrust on the operation rod 65h. At the gear-engaging position PR2 (stroke start position), however, the thrust is small as indicated by a solid line (1) since the gap is large between the first moving iron core 63h, the second moving iron core 64h and the first attraction portion 622h, the second attraction portion 624h. The thrust increases as indicated by the solid line (1) as the first moving iron core 63h and the second moving iron core 64h move toward the first attraction portion 622h and the second attraction portion 624h. As the neutral position represented by P0 in FIG. 22(a) is passed, i.e., as the neutral state shown in FIG. 21(a) is passed (as the neutral state shown in FIG. 8(a) is passed in the case of the synchronizing device), the gap decreases between the second moving iron core 64h and the second attraction portion 624h, and the thrust sharply increases. At the synchronizing position represented by PL1 in FIG. 22(a), i.e., at a position just before the second moving iron core 64h comes in contact with the second attraction portion 624h (at the synchronizing position shown in FIG. 8(b) in the case of the synchronizing device), therefore, a large thrust is obtained as indicated by the solid line (1) enabling the synchronizing device to quickly execute the synchronizing action.

As the operation rod 65h arrives at a position just after the synchronizing position represented by PLM in FIG. 22(a), the second moving core 64h comes in contact with the second attraction portion 624h, and the thrust increases up to a position PLM just after the synchronizing position, as indicated by the solid line (1). As the second moving iron core 64h comes in contact with the second attraction portion 624h, the second moving iron core 64h is limited from moving toward the left in the drawing. After the motion of the second moving iron core 64h is limited, the first moving iron core 63h is attracted by the first attraction portion 622h to produce a thrust. Therefore, the thrust characteristics become as indicated by a solid line (2) of from the position PLM just after the synchronizing position in FIG. 22(a) up to the gear-engaging position (end of stroke) represented by PL2, i.e., up to the gear-engaging position shown in FIG. 21(c) (gear-engaging position shown in FIG. 8(c) in the case of the synchronizing device). That is, the thrust drops at a moment when the position PLM just after the synchronizing position is passed. Thereafter, the thrust increases in compliance with a curve of secondary degree toward the gear-engaging position (end of stroke) represented by PL2 in FIG. 22(a). The gear-engaged state shown in FIG. 21(c) (gear-engaged state shown in FIG. 8(c) in the case of the synchronizing device) is assumed at the gear-engaging position (end of stroke) represented by PL2.

Next, described below with reference to FIG. 22(b) is the thrust at each of the operation positions (graph indicated by a solid line) of when the second electromagnetic solenoid 7h is energized to be operated from a state where the first electromagnetic solenoid 6h and the second electromagnetic solenoid 7h are in the gear-engaged state PL2 shown in FIG. 21(c) up to the gear-engaging position PR2 shown in FIG. 21(e).

When an electric current is supplied to the electromagnetic coil 71h of the second electromagnetic solenoid 7h in the gear-engaged state shown in FIG. 21(c) (gear-engaged state shown in FIG. 8(c) in the case of the synchronizing device), the fixed iron core 72h is excited, and the first moving iron core 73h and the second moving iron core 74h are attracted by the first attraction portion 722h and by the second attraction portion 724h to produce a thrust on the operation rod 75h. At the gear-engaging position PL2 (stroke start position), however, the thrust is small as indicated by the solid line (1) since the gap is large between the first moving iron core 73h, the second moving iron core 74h and the first attraction portion 722h, the second attraction portion 724h. The thrust increases as indicated by the solid line (1) as the first moving iron core 73h and the second moving iron core 74h move toward the first attraction portion 722h and the second attraction portion 724h. As the neutral position represented by P0 in FIG. 22(b) is passed, i.e., as the neutral state shown in FIG. 21(a) is passed (as the neutral state shown in FIG. 8(a) is passed in the case of the synchronizing device), the gap decreases between the second moving iron core 74h and the second attraction portion 724h, and the thrust sharply increases. At the synchronizing position represented by PR1 in FIG. 22(b), i.e., at a position just before the second moving iron core 74h comes in contact with the second attraction portion 724h (at the synchronizing position shown in FIG. 8(d) in the case of the synchronizing device), therefore, a large thrust is obtained as indicated by the solid line (1) enabling the synchronizing device to quickly execute the synchronizing action.

As the operation rod 75h arrives at a position just after the synchronizing position represented by PRM in FIG. 22(b), the second moving core 74h comes in contact with the second attraction portion 724h, and the thrust increases up to the position PRM just after the synchronizing position, as indicated by the solid line (1). As the second moving iron core 74h comes in contact with the second attraction portion 724h, the second moving iron core 74h is limited from moving toward the right in the drawing. After the motion of the second moving iron core 74h is limited, the first moving iron core 73h is attracted by the first attraction portion 722h to produce a thrust. Therefore, the thrust characteristics become as indicated by a solid line (2) of from the position PRM just after the synchronizing position in FIG. 22(b) up to the gear-engaging position (end of stroke) represented by PR2, i.e., up to the gear-engaging position shown in FIG. 21(e) (gear-engaging position shown in FIG. 8(e) in the case of the synchronizing device That is, the thrust decreases at a moment when the position PRM just after the synchronizing position is passed. Thereafter, the thrust increases in compliance with a curve of secondary degree toward the gear-engaging position (end of stroke) represented by PR2 in FIG. 22(b). The gear-engaged state shown in FIG. 21(e) (gear-engaged state shown in FIG. 8(e) in the case of the synchronizing device) is assumed at the gear-engaging position (end of stroke) represented by PR2.

As described above, the shift actuator 5h comprising the first electromagnetic solenoid 6h and the second electromagnetic solenoid 7h according to the ninth embodiment exhibits thrust characteristics that once rise near the synchronizing position of the synchronizing device. Accordingly, a required thrust can be obtained at the synchronizing position where the operation force is required and hence, it becomes possible to make the electromagnetic solenoids in to a small size. That is, in FIGS. 22(a) and 22(b), broken lines indicate thrust characteristics of when the shift actuator employing the conventional electromagnetic solenoids is constituted in the same size as the shift actuator 5h of the ninth embodiment, from which it will be learned that the thrust of the shift actuator employing the conventional electromagnetic solenoids is small at the synchronizing positions (PL1, PR1) as compared to the thrust characteristics of the shift actuator 5h of the ninth embodiment indicated by solid lines. Therefore, the conventional shift actuator must employ the electromagnetic solenoids having an increased ability in order to produce the thrust comparable to that of the shift actuator 5h of the ninth embodiment at the synchronizing positions (PL1, PR1).

In the foregoing were described the embodiments in which the present invention is applied to the shift actuator that constitutes the gear change device in combination with the select actuator. The shift actuator of the present invention can be also applied to, for example, a shift-assisting device for assisting the force of operation in the shifting direction in the manual transmissions.

I claim:

1. A shift actuator for a transmission, said shift actuator actuating, in a direction of shift, a shift lever for operating a synchronizing device of the transmission, the synchronizing device having a synchronizing position, said shift actuator comprising:

a first electromagnetic solenoid and a second electromagnetic solenoid for actuating an operation member coupled to said shift lever in directions opposite to each other, each of said first electromagnetic solenoid and said second electromagnetic solenoid comprising a casing, a fixed iron core disposed in said casing, a moving iron core able to approach, and separate away from, said fixed iron core, an operation rod mounted on said moving iron core for movement therewith to move the operation member, and an electromagnetic coil arranged between said casing and said fixed and moving iron cores, wherein:

said fixed iron core and said moving iron core have opposing surfaces, the opposing surface of one of said fixed iron core and said moving iron core has a stepped protuberance formed thereon, the opposing surface of the other of said fixed iron core and said moving iron core has a stepped recess formed therein to correspond to said stepped protuberance, and an edge of said stepped protuberance and an edge of said stepped recess are closest to each other at a position corresponding to the synchronizing position of the synchronizing device.

2. A shift actuator as claimed in claim 1, wherein each of said stepped protuberance and said stepped recess has a substantially uniform diameter over the length thereof.

3. A shift actuator as claimed in claim 1, wherein each of said stepped protuberance and said stepped recess is tapered over the length thereof.

* * * * *